(12) United States Patent
Fan et al.

(10) Patent No.: US 11,605,837 B2
(45) Date of Patent: Mar. 14, 2023

(54) POSITIVE TEMPERATURE COEFFICIENT FILM, POSITIVE TEMPERATURE COEFFICIENT ELECTRODE, POSITIVE TEMPERATURE COEFFICIENT SEPARATOR, AND BATTERY COMPRISING THE SAME

(71) Applicant: American Lithium Energy Corporation, Carlsbad, CA (US)

(72) Inventors: Jiang Fan, San Diego, CA (US); Dengguo Wu, San Diego, CA (US)

(73) Assignee: American Lithium Energy Corporation, Carlsbad, CA (US)

( * ) Notice: Subject to any disclaimer, the term of this patent is extended or adjusted under 35 U.S.C. 154(b) by 68 days.

(21) Appl. No.: 17/340,871

(22) Filed: Jun. 7, 2021

(65) Prior Publication Data

US 2021/0313627 A1    Oct. 7, 2021

Related U.S. Application Data

(63) Continuation of application No. 16/403,157, filed on May 3, 2019, now Pat. No. 11,056,726, which is a
(Continued)

(51) Int. Cl.
*H01M 4/02* (2006.01)
*H01M 10/42* (2006.01)
(Continued)

(52) U.S. Cl.
CPC ...... *H01M 10/4235* (2013.01); *C09D 109/06* (2013.01); *C09D 123/12* (2013.01);
(Continued)

(58) Field of Classification Search
CPC ..................................................... H01M 4/02
See application file for complete search history.

(56) References Cited

U.S. PATENT DOCUMENTS 2,664,481 A   12/1953   Pearl et al.
4,075,400 A   2/1978    Fritts
(Continued)

FOREIGN PATENT DOCUMENTS

CN    1121264 A      4/1996
CN    103194161 A    7/2013
(Continued)

OTHER PUBLICATIONS

Eichstadt, Amy E., et al. "Structure-Property Relationships for a Series of Amorphous Partially Aliphatic Polyimides." *Journal of Polymer Science Part B: Polymer Physics* 40.14 (2002): 1503-1512.
(Continued)

*Primary Examiner* — Jacob B Marks
(74) *Attorney, Agent, or Firm* — Mintz Levin Cohn Ferris Glovsky and Popeo, P.C.

(57) ABSTRACT

Provided herein is a positive temperature coefficient film comprising an inorganic positive temperature coefficient compound. Also provided herein are a positive temperature coefficient electrode, a positive temperature coefficient separator, and a positive temperature coefficient lithium secondary battery, each of which comprises the positive temperature coefficient film.

24 Claims, 3 Drawing Sheets

Related U.S. Application Data continuation of application No. 15/717,529, filed on Sep. 27, 2017, now Pat. No. 10,326,173, which is a continuation of application No. 15/409,449, filed on Jan. 18, 2017, now Pat. No. 9,806,382, which is a continuation of application No. 14/028,482, filed on Sep. 16, 2013, now Pat. No. 9,627,722.

(51) Int. Cl.

| | | |
|---|---|---|
| *H01M 10/613* | (2014.01) | |
| *C09D 109/06* | (2006.01) | |
| *C09D 123/12* | (2006.01) | |
| *C09D 127/16* | (2006.01) | |
| *C09D 179/08* | (2006.01) | |
| *C09K 21/00* | (2006.01) | |
| *C09K 21/02* | (2006.01) | |
| *C09K 21/12* | (2006.01) | |
| *H01M 4/525* | (2010.01) | |
| *H01M 10/0525* | (2010.01) | |
| *C08K 3/04* | (2006.01) | |
| *C08K 3/22* | (2006.01) | |
| *C08K 5/42* | (2006.01) | |

(52) U.S. Cl.
CPC ......... *C09D 127/16* (2013.01); *C09D 179/08* (2013.01); *C09K 21/00* (2013.01); *C09K 21/02* (2013.01); *C09K 21/12* (2013.01); *H01M 4/525* (2013.01); *H01M 10/0525* (2013.01); *H01M 10/613* (2015.04); *C08K 3/04* (2013.01); *C08K 3/22* (2013.01); *C08K 5/42* (2013.01); *C08K 2003/2206* (2013.01); *C08K 2003/2237* (2013.01); *C08K 2201/001* (2013.01); *H01M 2200/106* (2013.01)

(56) References Cited

U.S. PATENT DOCUMENTS

| | | | |
|---|---|---|---|
| 4,361,799 A | 11/1982 | Lutz | |
| 4,456,631 A | 6/1984 | Crosbie et al. | |
| 4,541,735 A | 9/1985 | Abu-Isa | |
| 4,975,341 A | 12/1990 | Tucholski et al. | |
| 5,188,909 A | 2/1993 | Pedicini | |
| 5,504,128 A | 4/1996 | Mizutani et al. | |
| 5,507,842 A | 4/1996 | Fiorino | |
| 5,754,090 A | 5/1998 | Arensmeier | |
| 5,776,627 A | 7/1998 | Mao et al. | |
| 6,005,469 A | 12/1999 | Kalapodis et al. | |
| 6,018,286 A | 1/2000 | Quinn et al. | |
| 6,078,244 A | 6/2000 | Quinn et al. | |
| 6,084,501 A | 7/2000 | Plasko | |
| 6,181,545 B1 | 1/2001 | Amatucci et al. | |
| 6,191,679 B1 | 2/2001 | Kalapodis et al. | |
| 6,342,826 B1 | 1/2002 | Quinn et al. | |
| 6,387,570 B1 | 5/2002 | Nakamura et al. | |
| 6,570,749 B1 | 5/2003 | Ling et al. | |
| 6,576,373 B1 | 6/2003 | Iwamoto et al. | |
| 6,780,544 B2 | 8/2004 | Noh | |
| 7,203,049 B2 | 4/2007 | Chu et al. | |
| 7,390,589 B2 | 6/2008 | Shin et al. | |
| 8,021,788 B2 | 9/2011 | Kim et al. | |
| 8,754,740 B2 | 6/2014 | Pinto et al. | |
| 8,841,011 B2 | 9/2014 | Jang | |
| 9,627,722 B1 | 4/2017 | Fan et al. | |
| 9,806,382 B1 | 10/2017 | Fan et al. | |
| 2002/0197533 A1 | 12/2002 | Gao et al. | |
| 2005/0079422 A1 | 4/2005 | Ko et al. | |
| 2006/0099506 A1 | 5/2006 | Krause et al. | |
| 2007/0166609 A1 | 7/2007 | Lee et al. | |
| 2007/0210893 A1 | 9/2007 | Hasunuma et al. | |
| 2007/0269718 A1 | 11/2007 | Krause et al. | |
| 2008/0116423 A1 | 5/2008 | Fan et al. | |
| 2008/0241684 A1 | 10/2008 | Muraoka et al. | |
| 2008/0254343 A1 | 10/2008 | Kaplin et al. | |
| 2008/0292939 A1 | 11/2008 | Xie | |
| 2009/0027158 A1 | 1/2009 | Kajino et al. | |
| 2009/0092892 A1 | 4/2009 | Yamaguchi et al. | |
| 2009/0191463 A1 | 7/2009 | Ide et al. | |
| 2010/0047674 A1 | 2/2010 | Ryu et al. | |
| 2010/0099022 A1 | 4/2010 | Nishida et al. | |
| 2010/0143753 A1 | 6/2010 | Kim et al. | |
| 2010/0167107 A1 | 7/2010 | Byun et al. | |
| 2010/0233543 A1 | 9/2010 | Numata et al. | |
| 2010/0247987 A1 | 9/2010 | Holung et al. | |
| 2011/0045321 A1 | 2/2011 | Park et al. | |
| 2011/0052950 A1 | 3/2011 | Yoo | |
| 2011/0117403 A1 | 5/2011 | Hermann et al. | |
| 2011/0151293 A1 | 6/2011 | Kim et al. | |
| 2011/0157755 A1 | 6/2011 | Honkura | |
| 2011/0217589 A1 | 9/2011 | Kobayashi et al. | |
| 2011/0256443 A1 | 10/2011 | Park et al. | |
| 2011/0273807 A1 | 11/2011 | Kim et al. | |
| 2011/0273809 A1 | 11/2011 | Falsett et al. | |
| 2012/0056709 A1 | 3/2012 | Kajino et al. | |
| 2012/0058375 A1 | 3/2012 | Tanaka et al. | |
| 2012/0068127 A1 | 3/2012 | Kawase et al. | |
| 2012/0121974 A1 | 5/2012 | Tikhonov et al. | |
| 2012/0189881 A1 | 7/2012 | Geoffroy et al. | |
| 2013/0004811 A1 | 1/2013 | Banerjee et al. | |
| 2013/0101869 A1 | 4/2013 | Farmer | |
| 2013/0130075 A1* | 5/2013 | Kim | H01M 50/581 429/62 |
| 2013/0171502 A1 | 7/2013 | Chen et al. | |
| 2013/0216867 A1 | 8/2013 | Schaefer et al. | |
| 2014/0072851 A1 | 3/2014 | Oh et al. | |
| 2014/0168845 A1 | 6/2014 | Charles | |
| 2014/0178753 A1 | 6/2014 | Chu et al. | |
| 2014/0295248 A1 | 10/2014 | Hotta et al. | |
| 2014/0377629 A1 | 12/2014 | Miyazaki et al. | |
| 2015/0004448 A1 | 1/2015 | Morita et al. | |
| 2015/0280241 A1 | 10/2015 | Hara et al. | |
| 2015/0303484 A1 | 10/2015 | Iida et al. | |
| 2015/0311001 A1 | 10/2015 | Kato et al. | |
| 2016/0149196 A1 | 5/2016 | Fan et al. | |
| 2016/0149199 A1 | 5/2016 | Fan | |
| 2016/0149268 A1 | 5/2016 | Fan et al. | |
| 2016/0149269 A1 | 5/2016 | Fan et al. | |
| 2016/0181590 A1 | 6/2016 | Fan et al. | |
| 2016/0322641 A1 | 11/2016 | Saito et al. | |
| 2018/0019505 A1 | 1/2018 | Fan et al. | |

FOREIGN PATENT DOCUMENTS

| | | |
|---|---|---|
| CN | 104937320 A | 9/2015 |
| CN | 105680086 A | 6/2016 |
| EP | 0450549 A1 | 10/1991 |
| EP | 0776058 A2 | 5/1997 |
| EP | 1246280 A2 | 10/2002 |
| JP | 7220755 A2 | 8/1995 |
| JP | H07-220755 A | 8/1995 |
| JP | H09-320568 A | 12/1997 |
| JP | 2000-077061 A | 3/2000 |
| JP | 2005-011540 A | 1/2005 |
| JP | 2007-280803 A | 10/2007 |
| JP | 2010-146726 A | 7/2010 |
| JP | 2012-074359 A | 4/2012 |
| KR | 20130123492 A | 11/2013 |
| TW | 200601656 A | 1/2006 |
| WO | WO-2004/049494 A1 | 6/2004 |
| WO | WO-2015/060175 A1 | 4/2015 |
| WO | WO-2016/086184 A1 | 6/2016 |

OTHER PUBLICATIONS

Fang, Xingzhong, et al. "Synthesis and properties of polyimides derived from cis-and trans-1, 2, 3, 4-cyclohexanetetracarboxylic dianhydrides." *Polymer* 45.8 (2004): 2539-2549.
Fisher, D.J. (2018) "Negative Thermal Expansion Materials." Jan. 15, 2018, Materials Research Forum LLC, p. 7, p. 86. 11 pages.

(56) References Cited

OTHER PUBLICATIONS

International Search Report and Written Opinion issued in International Application No. PCT/2015/062767, dated Feb. 12, 2016. 14 pages.
Jeon, Jong-Young, and Tae-Moon Tak. "Synthesis of Aliphatic-Aromatic Polyimides by Two-Step Polymerization of Aliphatic Dianhydride and Aromatic Diamine." *Journal of Applied Polymer Science* 60.11 (1996): 1921-1926.
Loncrini, D. F., and J. M. Witzel. "Polyaryleneimides of meso- and d- 1, 2, 3, 4-Butanetetracarboxylic Acid Dianhydrides." *Journal of Polymer Science Part A-1: Polymer Chemistry* 7.8 (1969): 2185-2193.
Matsumoto, Toshihiko. "Aliphatic polyimides derived from polyalicyclic monomers." *High Performance Polymers* 13.2 (2001): S85-S92.
Schab-Balcerzak, E., et al. "Synthesis and characterization of organosoluble aliphatic-aromatic copolyimides based on cycloaliphatic dianhydride." *European Polymer Journal* 38.3 (2002): 423-430.
Seino, Hiroshi, Amane Mochizuki, and Mitsuru Ueda. "Synthesis of Aliphatic Polyimides Containing Adamantyl Units." *Journal of Polymer Science Part A Polymer Chemistry* 37.18 (1999): 3584-3590.
Seino, Hiroshi, et al. "Synthesis of fully aliphatic polyimides." *High Performance Polymers* 11.3 (1999): 255-262.
Spotnitz, R., and J. Franklin. "Abuse behavior of high-power, lithium-ion cells." *Journal of Power Sources* 113.1 (2003): 81-100.

\* cited by examiner

POSITIVE TEMPERATURE COEFFICIENT FILM, POSITIVE TEMPERATURE COEFFICIENT ELECTRODE, POSITIVE TEMPERATURE COEFFICIENT SEPARATOR, AND BATTERY COMPRISING THE SAME

RELATED APPLICATIONS

This application is a continuation application of U.S. patent application Ser. No. 16/403,157, filed on May 3, 2019, now U.S. Pat. No. 11,056,726, entitled "POSITIVE TEMPERATURE COEFFICIENT FILM, POSITIVE TEMPERATURE COEFFICIENT ELECTRODE, POSITIVE TEMPERATURE COEFFICIENT SEPARATOR, AND BATTERY COMPRISING THE SAME," which is a continuation application of U.S. patent application Ser. No. 15/717,529, filed on Sep. 27, 2017, now U.S. Pat. No. 10,326,178, entitled "POSITIVE TEMPERATURE COEFFICIENT FILM, POSITIVE TEMPERATURE COEFFICIENT ELECTRODE, POSITIVE TEMPERATURE COEFFICIENT SEPARATOR, AND BATTERY COMPRISING THE SAME," which is a continuation application of U.S. patent application Ser. No. 15/409,449, filed on Jan. 18, 2017, now U.S. Pat. No. 9,806,382, entitled "POSITIVE TEMPERATURE COEFFICIENT FILM, POSITIVE TEMPERATURE COEFFICIENT ELECTRODE, POSITIVE TEMPERATURE COEFFICIENT SEPARATOR, AND BATTERY COMPRISING THE SAME," which is a continuation application of U.S. patent application Ser. No. 14/028,482, filed Sep. 16, 2013, now U.S. Pat. No. 9,627,722, entitled "POSITIVE TEMPERATURE COEFFICIENT FILM, POSITIVE TEMPERATURE COEFFICIENT ELECTRODE, POSITIVE TEMPERATURE COEFFICIENT SEPARATOR, AND BATTERY COMPRISING THE SAME," the contents of which are hereby incorporated by reference in their entirety.

FIELD

Provided herein is a positive temperature coefficient film comprising an inorganic positive temperature coefficient compound. Also provided herein are a positive temperature coefficient electrode, a positive temperature coefficient separator, and a positive temperature coefficient battery, each of which comprises the positive temperature coefficient film.

BACKGROUND

Rechargeable lithium batteries, also known as lithium-ion batteries or lithium secondary batteries, are among the most popular rechargeable batteries for portable electronic devices. Beyond consumer electronics, rechargeable lithium batteries also become popular for military, electronic vehicle, and aerospace applications. One major safety concern with the current commercial rechargeable lithium batteries is that the batteries may suffer thermal runaway and cell rupture if overheated or overcharged. Spotnitz and Franklin, *J. Power Sources* 2003, 113, 81-100. In extreme cases, this can lead to combustion. In 2006, for example, Sony recalled about 6 millions notebook computer batteries after a number of instances where the batteries overheat or caught fire. To reduce the risks, rechargeable lithium batteries are commonly equipped with various safety devices, such as an external positive temperature coefficient (PTC) resistor. However, such an external PTC device may not respond adequately when a hazardous reaction occurs in very high rate, e.g., when an internal short circuit occurs. Thus, there is a great demand for rechargeable lithium batteries with an improved safety profile, especially rechargeable lithium batteries with high energy capacity. Therefore, there is a need for a PTC electrode for developing a rechargeable lithium battery with an improved safety profile.

SUMMARY OF THE DISCLOSURE

Provided herein is a positive temperature coefficient (PTC) film comprising an inorganic PTC compound, a crosslinked polymer, optionally a conductive material, and optionally a filler. In one embodiment, the inorganic PTC compound is in the form of particles, in one embodiment, nanoparticles. In another embodiment, the crosslinked polymer is formed in the presence of the inorganic PTC compound, in one embodiment, in the presence of nanoparticles of the inorganic PTC compound. In yet another embodiment, the positive temperature coefficient (PTC) film further comprises a phase transition material and/or a fireretardant material.

Also provided herein is a PTC film comprising no less than about 70% by weight of an inorganic PTC compound, no greater than about 30% by weight of a polymer, and optionally no greater than about 5% by weight of a conductive material. In one embodiment, the inorganic PTC compound is in the form of particles, in one embodiment, nanoparticles.

Additionally, provided herein is a PTC film comprising an inorganic PTC compound, a polymer, and optionally a conductive material; wherein the PTC film is formed using water as a solvent.

Furthermore, provided herein is a method for preparing a PTC film that comprises an inorganic PTC compound and a crosslinked polymer; comprising the steps of:
(i) coating a mixture of the inorganic PTC compound and the crosslinked polymer in a solvent onto at a flat surface to form a wet PTC film; and
(ii) curing the wet PTC film to form the PTC film.

Provided herein is a method for preparing a PTC film that comprises an inorganic PTC compound and a crosslinked polymer; comprising the steps of:
coating a mixture of the inorganic PTC compound and a precursor of the crosslinked polymer, in one embodiment, a crosslinkable polymer, in a solvent onto at a flat surface to form a wet PTC film; and
(ii) curing the wet PTC film by crosslinking the precursor to form the PTC film.

Provided herein is a method for preparing a PTC film comprising an inorganic PTC compound, a polymer, and optionally a conductive material; comprising the steps of:
(i) coating a mixture of the inorganic PTC compound, the polymer, and optionally the conductive material in water onto at a flat surface to form a wet PTC film; and
(ii) curing the wet PTC film to form the PTC film.

Provided herein is a PTC electrode comprising (i) a current collector; (ii) a PTC film comprising an inorganic PTC compound, a crosslinked polymer, optionally a conductive material, and optionally a filler; and (iii) an electroactive material layer.

Provided herein is a PTC electrode comprising (i) a current collector; (ii) a PTC film comprising no less than about 70% by weight of an inorganic PTC compound, no greater than about 30% by weight of a polymer, and optionally no greater than about 5% by weight of a conductive material; and (iii) an electroactive material layer.

Provided herein is a PTC electrode comprising (i) a current collector; (ii) a PTC film comprising an inorganic PTC compound, a polymer, and optionally a conductive material; and (ii) an electroactive material layer; wherein the PTC film is formed using water as s solvent and the electroactive material layer is formed using an organic solvent.

Provided herein is a PTC electrode comprising (i) a current collector; (ii) a ceramic PTC film comprising an inorganic PTC compound; and (iii) an electroactive material layer.

Provided herein is a method for preparing a PTC electrode that comprises a current collector, a PTC film comprising an inorganic PTC compound and a crosslinked polymer, and an electroactive material layer; comprising the steps of:

(i) coating a mixture of the inorganic PTC compound and the crosslinked polymer in a first solvent onto a surface of the current collector to form a wet PTC film;

(ii) curing the wet PTC film to form the PTC film; and (iii) coating the electroactive material in a second solvent onto the surface of the PTC film to form the electroactive material layer and thus to form the PTC electrode.

Provided herein is a method for preparing a PTC electrode that comprises a current collector, a PTC film comprising an inorganic PTC compound and a crosslinked polymer, and an electroactive material layer; comprising the steps of:

coating a mixture of the inorganic PTC compound, a precursor of the crosslinked polymer, in one embodiment, a crosslinkable polymer, in a first solvent onto a surface of the current collector to form a wet PTC film;

(ii) curing the PTC film by crosslinking the precursor to form the PTC film; and (iii) coating the electroactive material in a second solvent onto the surface of the PTC film to form the electroactive material layer, and thus to form the PTC electrode.

Provided herein is a method for preparing a PTC electrode that comprises a current collector, a PTC film comprising an inorganic PTC compound and a polymer, and an electroactive material layer; comprising the steps of:

(i) coating a mixture of the inorganic PTC compound and the polymer in a first solvent onto a surface of the current collector to form the PTC film; and (ii) coating the electroactive material in a second solvent onto the surface of the PTC film to form the electroactive material layer and thus to form the PTC electrode.

Provided herein is a PTC separator comprising a separator and a PTC film comprising an inorganic PTC compound, a crosslinked polymer, optionally a conductive material, and optionally a filler.

Provided herein is a PTC separator comprising a separator and a PTC film comprising no less than about 70% by weight of an inorganic PTC compound, no greater than about 30% by weight of a polymer, and optionally no greater than about 5% by weight of a conductive material.

Provided herein is a PTC separator comprising a separator and a PTC film comprising an inorganic PTC compound, a polymer, and optionally a conductive material; wherein the PTC film is formed using water as s solvent.

Provided herein is a PTC separator comprising a separator and a ceramic PTC film comprising an inorganic PTC compound.

Provided herein is a battery, in one embodiment, a lithium-secondary battery, which comprises (i) an anode; (ii) a cathode; (iii) a separator that separates the anode and cathode; and (iv) electrolyte; wherein at least one of the anode and cathode is a PTC electrode; or the separator is a PTC separator.

DETAILED DESCRIPTION

Figure 1:
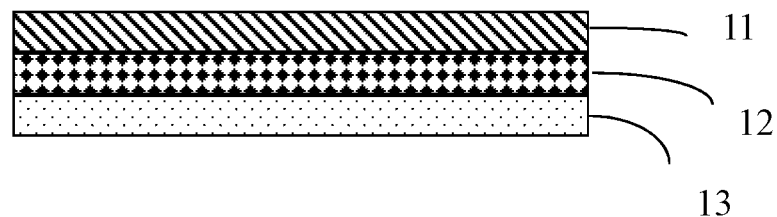
FIG. 1 is a schematic drawing of a PTC electrode comprising a current collector 11, a PTC film 12, and an electroactive material layer 13.
Figure 2:
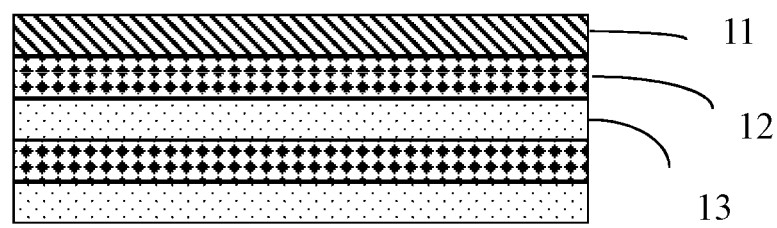
FIG. 2 is a schematic drawing of a PTC electrode comprising a current collector 11, two PTC films 12, and two electroactive material layers 13.
Figure 3A:
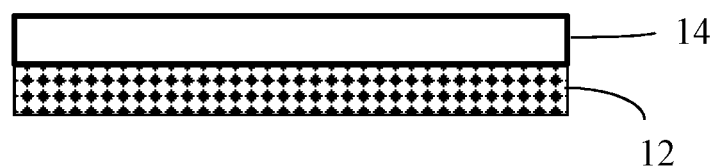
FIG. 3A and FIG. 3B are schematic drawings of two PTC separators: one comprising a PTC film 12 and a separator 14 (FIG. 3A) and the other comprising tow PTC films 12 and a separator 14 (FIG. 3B).
Figure 3B:
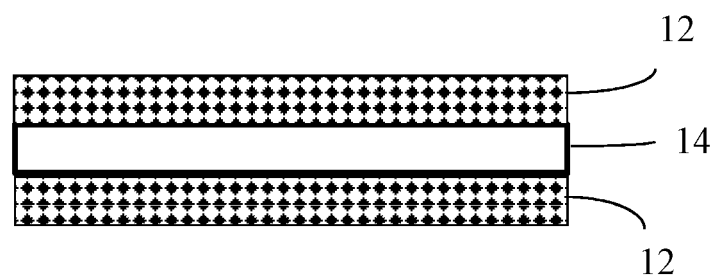
Figure 4:
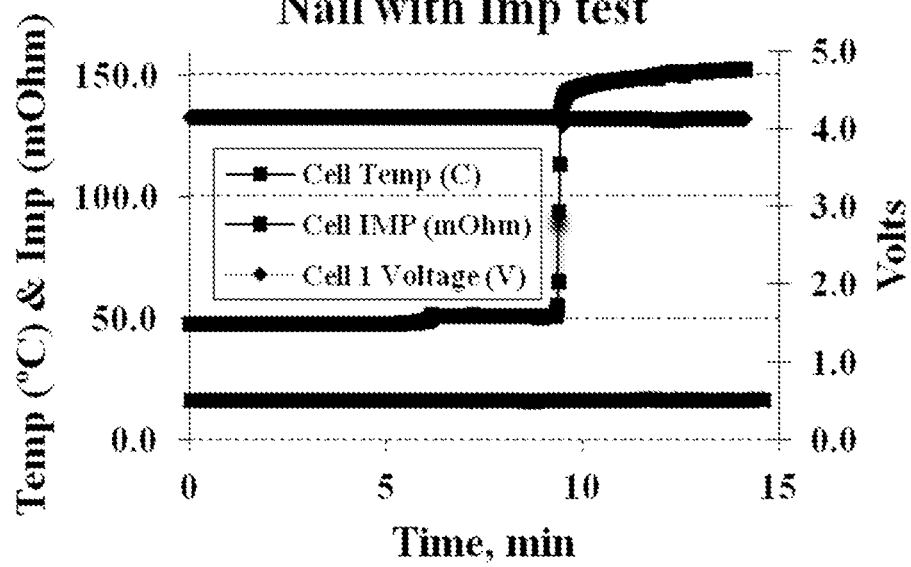
FIG. 4 shows voltage, impedance, and temperature profiles of a lithium-secondary battery having a PTC cathode as provided herein in a nail test.
Figure 5:
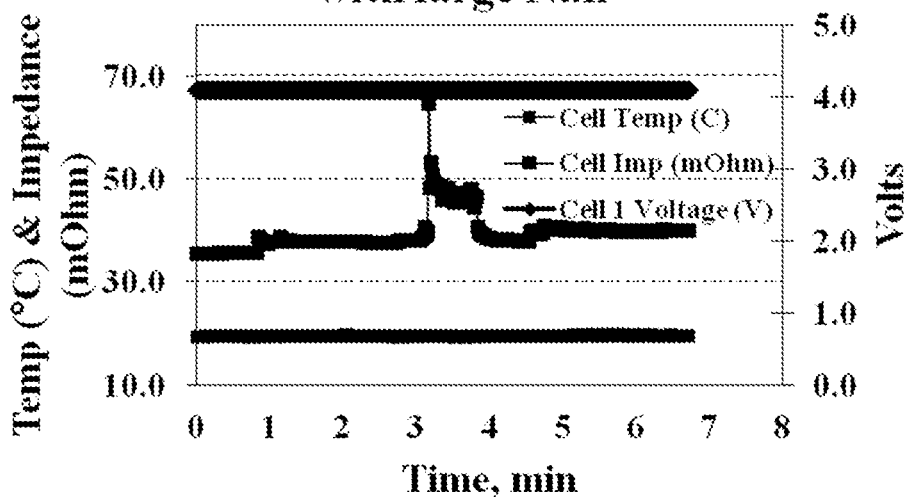
FIG. 5 shows voltage, impedance, and temperature profiles of a lithium-secondary battery having a PTC cathode as provided herein in a nail test with a 7 mm diameter nail.
Figure 6:
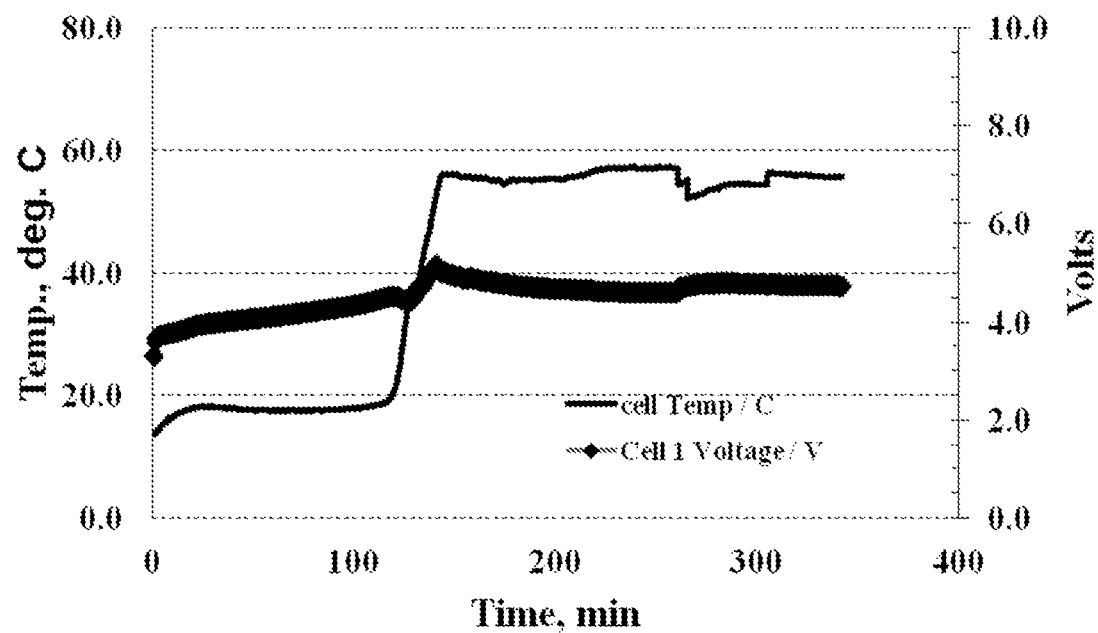
FIG. 6 shows voltage and temperature profiles of a lithium-secondary battery having a PTC cathode as provided herein in a 2A/20V overcharge test. No fire and no explosion occurred during the overcharge test.

To facilitate understanding of the disclosure set forth herein, a number of terms are defined below.

Generally, the nomenclature used herein and the laboratory procedures in electrochemistry, inorganic chemistry, polymer chemistry, organic chemistry, and others described herein are those well known and commonly employed in the art. Unless defined otherwise, all technical and scientific terms used herein generally have the same meaning as commonly understood by one of ordinary skill in the art to which this disclosure belongs.

The term "anode" or "negative electrode" refers to an electrode where electrochemical oxidation occurs during discharging process. For example, an anode undergoes delithiation during discharging.

The term "cathode" or "positive electrode" refers to an electrode where electrochemical reduction occurs during discharging process. For example, a cathode undergoes lithiation during discharging.

The term "separator" refers to a porous membrane placed between electrodes of opposite polarity, permeable to ionic flow but preventing electric contact of the electrodes.

The term "charging" refers to a process of providing electrical energy to an electrochemical cell.

The term "discharging" refers to a process of removing electrical energy from an electrochemical cell. In certain embodiments, discharging refers to a process of using the electrochemical cell to do useful work.

The term "electrochemically active," "electrically active," and "electroactive" are used interchangeably and refer to a material that is capable to incorporate lithium in its atomic lattice structure.

The term "lithiation" refers to a chemical process of inserting lithium into an electroactive material in an electrochemical cell. In certain embodiments, an electrode undergoes electrochemical reduction during lithiation process.

The term "delithiation" refers to a chemical process of removing lithium from an electroactive material in an electrochemical cell. In certain embodiments, an electrode undergoes electrochemical oxidation during delithiation process.

The term "metal" refers to both metals and metalloids, including silicon and germanium. The phrase "a main group metal" is intended to include Sn, Si, Al, Bi, Ge, and Pb.

The terms "film" and "layer" are used herein interchangeably to refer a thin membrane, in one embodiment, a coating on a surface.

The term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

Positive Temperature Coefficient Films

In one embodiment, provided herein is a PTC film comprising (i) an inorganic PTC compound, in one embodiment, particles of the inorganic PTC compound, in another embodiment, nanoparticles of the inorganic PTC compound; and (ii) a crosslinked polymer.

In certain embodiments, the inorganic PTC compound is a barium compound, a vanadium compound, a tin compound, a chromium compound or a mixture thereof. In certain embodiments, the inorganic PTC compound is barium titanate, a doped barium titanate, vanadium trioxide, a doped vanadium trioxide, tin dioxide ($SnO_2$), chromium oxide ($Cr_2O_3$), or a mixture thereof. In certain embodiments, the inorganic PTC compound is barium titanate or a doped barium titanate. In certain embodiments, the inorganic PTC compound is vanadium trioxide or a doped vanadium trioxide. In certain embodiments, the inorganic PTC compound is tin dioxide. In certain embodiments, the inorganic PTC compound is chromium oxide.

In certain embodiments, the inorganic PTC compound is a barium compound. In certain embodiments, the inorganic PTC compound is a barium salt. In certain embodiments, the inorganic PTC compound comprises barium titanate. In certain embodiments, the inorganic PTC compound is barium titanate.

In certain embodiments, the inorganic PTC compound comprises a doped barium titanate. In certain embodiments, the inorganic PTC compound is a doped barium titanate. In certain embodiments, the doped barium titanate is made by doping metal or material with a low-resistance phase into barium titanate. In certain embodiments, the metal doped into barium titanate is lanthanum, antimony, yttrium, niobium, tantalum, nickel, or a combination thereof. In certain embodiments, the doped barium titanate is $(Ba_{1-v-w}M_vSr_w)Ti_xO_3+ySiO_2$; wherein M is Er, Sm, Ce, La, or a combination thereof; $0.005 \geq v \geq 0.001$; $0.49 \geq w \geq 0.42$; $1.03 \geq x \geq 0.99$; and $0.030 \geq y \geq 0.002$. Examples of suitable barium compounds include those as described in U.S. Pat. App. Pub. No. 2012/0068127, the disclosure of which is incorporated herein by reference in its entirety. In certain embodiments, the doped barium titanate is $(Ba_{1-x}M_x)_z(Ti_{1-y}O_3R_y)O_3$; wherein M is Y, La, Ce, Pr, Nd, Sm, Gd, Dy, Er, Sm, Ce, La, or a combination thereof; R is V, Nb, Ta, or a combination thereof; $0.003 \geq x \geq 0.001$; $0.002 \geq y \geq 0$, and $1.1 \geq z \geq 0.99$. Examples of suitable barium compounds include those as described in U.S. Pat. App. Pub. No. 2012/0056709, the disclosure of which is incorporated herein by reference in its entirety.

In certain embodiments, the inorganic PTC compound is a vanadium compound. In certain embodiments, the inorganic PTC compound is a vanadium oxide. In certain embodiments, the inorganic PTC compound comprises vanadium trioxide. In certain embodiments, the inorganic PTC compound is vanadium trioxide ($V_2O_3$).

In certain embodiments, the inorganic PTC compound is a doped vanadium trioxide. In certain embodiments, the doped $V_2O_3$ is made by doping metal or material with a low-resistance phase into $V_2O_3$. In certain embodiments, the metal doped into $V_2O_3$ is lanthanum, antimony, yttrium, niobium, tantalum, nickel, or a combination thereof.

In certain embodiments, the inorganic PTC compound is in the form of particles. In certain embodiments, the inorganic PTC compound is in the form of micrometer-sized particles. In certain embodiments, the inorganic PTC compound is in the form of nanoparticles. In certain embodiments, the inorganic PTC compound has an average particle size ranging from about 1 to about 1,000 nm, from about 2 to about 500 nm, from about 5 to about 500 nm, from about 10 to about 250 nm, from about 20 to about 250 nm, from about 50 to about 250 nm, or from about 100 to about 200 nm.

In certain embodiments, the inorganic PTC compound has an average particle size ranging from about 10 to about 250 nm. In certain embodiments, the inorganic PTC compound has an average particle size ranging from about 10 to about 100 nm. In certain embodiments, the inorganic PTC compound has an average particle size ranging from about 10 to about 50 nm. In certain embodiments, the inorganic PTC compound has an average particle size ranging from about 10 to about 20 nm.

In certain embodiments, the inorganic PTC compound has an average particle size ranging from about 20 to about 250 nm. In certain embodiments, the inorganic PTC compound has an average particle size ranging from about 20 to about 100 nm. In certain embodiments, the inorganic PTC compound has an average particle size ranging from about 20 to about 50 nm.

In certain embodiments, the inorganic PTC compound has an average particle size ranging from about 50 to about 250 nm. In certain embodiments, the inorganic PTC compound has an average particle size ranging from about 50 to about 200 nm. In certain embodiments, the inorganic PTC compound has an average particle size ranging from about 100 to about 200 nm.

In certain embodiments, the inorganic PTC compound has an average particle size of about 10, about 20, about 30, about 40, about 50, about 75, about 100, about 150, about 200, about 300, about 400, or about 500 nm.

In certain embodiments, the crosslinked polymer is a crosslinked polybenzophenone, a crosslinked polyacrylate, a crosslinked polyvinyl, a crosslinked polyethylene, a crosslinked polypropylene, a crosslinked polystyrene, a crosslinked polysulfone, a crosslinked 2,3-dihydrofuran-containing polymer, a crosslinked carboxymethyl cellulose (CMC), a crosslinked polyamide-imide, a crosslinked polyimide, a crosslinked styrene-containing copolymer, or a mixture thereof.

In certain embodiments, the crosslinked polymer is a crosslinked polybenzophenone. In certain embodiments, the crosslinked polymer is a crosslinked polyacrylate. In certain embodiments, the crosslinked polymer is a crosslinked polyvinyl. In certain embodiments, the crosslinked polymer is a crosslinked polyethylene. In certain embodiments, the crosslinked polymer is a crosslinked polypropylene. In certain embodiments, the crosslinked polymer is a crosslinked polystyrene. In certain embodiments, the crosslinked polymer is a crosslinked polysulfone. In certain embodiments, the crosslinked polymer is a crosslinked 2,3-dihydrofuran-containing polymer. In certain embodiments, the crosslinked polymer is a crosslinked carboxymethyl cellulose. In certain embodiments, the crosslinked polymer is a crosslinked polyamide-imide. In certain embodiments, the crosslinked polymer is a crosslinked polyimide. In certain embodiments, the crosslinked polymer is a crosslinked styrene-containing copolymer.

In certain embodiments, the crosslinked polymer is a thermally crosslinked polymer. In certain embodiments, the crosslinked polymer is a thermally crosslinked CMC, a thermally crosslinked polyamide-imide, a thermally crosslinked polyimide, or a mixture thereof. In certain embodiments, the crosslinked polymer is a thermally crosslinked CMC. In certain embodiments, the crosslinked polymer is a thermally crosslinked polyamide-imide. In certain embodiments, the crosslinked polymer is a thermally crosslinked polyimide.

In certain embodiments, the crosslinked polymer is a photo-crosslinked polymer.

In certain embodiments, the crosslinked polymer is a photo-crosslinked polybenzophenone, a photo-crosslinked polyacrylate, a photo-crosslinked polyvinyl, a photo-crosslinked polystyrene, a photo-crosslinked polysulfone, a photo-crosslinked 2,3-dihydrofuran-containing polymer, a photo-crosslinked styrene-containing copolymer, or a mixture thereof. In certain embodiments, the crosslinked polymer is a photo-crosslinked polybenzophenone. In certain embodiments, the crosslinked polymer is a photo-crosslinked polyacrylate. In certain embodiments, the crosslinked polymer is a photo-crosslinked polyvinyl. In certain embodiments, the crosslinked polymer is a photo-crosslinked polystyrene. In certain embodiments, the crosslinked polymer is a photo-crosslinked polysulfone. In certain embodiments, the crosslinked polymer is a photo-crosslinked 2,3-dihydrofuran-containing polymer. In certain embodiments, the crosslinked polymer is a photo-crosslinked styrene-containing copolymer.

In certain embodiments, the crosslinked polymer is a crosslinked PTC polymer. In certain embodiments, the crosslinked PTC polymer is a crosslinked polyethylene, a crosslinked polypropylene, or a mixture thereof. In certain embodiments, the crosslinked PTC polymer is a crosslinked high-density polyethylene, a crosslinked low-density polyethylene, a crosslinked high-density polypropylene, a crosslinked low-density polypropylene, or a mixture thereof.

In one embodiment, the crosslinked polymer is formed in the presence of the inorganic PTC compound. In another embodiment, the crosslinked polymer is formed in the presence of the particles of the inorganic PTC compound.

In certain embodiments, the crosslinked polymer is formed from one or more precursors of the crosslinked polymer. In certain embodiments, the precursor of the crosslinked polymer is a crosslinkable polymer. In certain embodiments, the precursor of the crosslinked polymer is a monomer.

In certain embodiments, the crosslinked polymer is formed by crosslinking one or more crosslinkable polymers. In certain embodiments, the crosslinkable polymer is a crosslinkable polybenzophenone, a crosslinkable polyacrylate, a crosslinkable polyvinyl, a crosslinkable polyethylene, a crosslinkable polypropylene, a crosslinkable polystyrene, a crosslinkable polysulfone, a crosslinkable 2,3-dihydrofuran-containing polymer, a crosslinkable carboxymethyl cellulose, a crosslinkable polyamide-imide, a crosslinkable polyimide, a crosslinkable styrene-containing copolymer, or a mixture thereof.

In certain embodiments, the crosslinkable polymer is a crosslinkable polybenzophenone. In certain embodiments, the crosslinkable polymer is a crosslinkable polyacrylate. In certain embodiments, the crosslinkable polymer is a crosslinkable polyvinyl. In certain embodiments, the crosslinkable polymer is a crosslinkable polyethylene. In certain embodiments, the crosslinkable polymer is a crosslinkable polypropylene. In certain embodiments, the crosslinkable polymer is a crosslinkable polystyrene. In certain embodiments, the crosslinkable polymer is a crosslinkable polysulfone. In certain embodiments, the crosslinkable polymer is a crosslinkable 2,3-dihydrofuran-containing polymer. In certain embodiments, the crosslinkable polymer is a crosslinkable carboxymethyl cellulose, a crosslinkable polyamide-imide. In certain embodiments, the crosslinkable polymer is a crosslinkable polyimide. In certain embodiments, the crosslinkable polymer is a crosslinkable styrene-containing copolymer.

In certain embodiments, the crosslinkable polymer is a thermally crosslinkable polymer. In certain embodiments, the crosslinkable polymer is a thermally crosslinkable CMC, a thermally crosslinkable polyamide-imide, a thermally crosslinkable polyimide, or a mixture thereof. In certain embodiments, the crosslinkable polymer is a thermally crosslinkable CMC. In certain embodiments, the crosslinkable polymer is a thermally crosslinkable polyamide-imide. In certain embodiments, the crosslinkable polymer is a thermally crosslinkable polyimide.

In certain embodiments, the crosslinkable polymer is a photo-crosslinkable polymer. In certain embodiments, the crosslinkable polymer is a photo-crosslinkable polybenzophenone, a photo-crosslinkable polyacrylate, a photo-crosslinkable polyvinyl, a photo-crosslinkable polystyrene, a photo-crosslinkable polysulfone, a photo-crosslinkable 2,3-dihydrofuran-containing polymer, a photo-crosslinkable styrene-containing copolymer, or a mixture thereof. In certain embodiments, the crosslinkable polymer is a photo-crosslinkable polymer. In certain embodiments, the crosslinkable polymer is a photo-crosslinkable polybenzophenone. In certain embodiments, the crosslinkable polymer is a photo-crosslinkable polyacrylate. In certain embodiments, the crosslinkable polymer is a photo-crosslinkable polyvinyl. In certain embodiments, the crosslinkable polymer is a photo-crosslinkable polystyrene. In certain embodiments, the crosslinkable polymer is a photo-crosslinkable polysulfone. In certain embodiments, the crosslinkable polymer is a photo-crosslinkable 2,3-dihydrofuran-containing polymer. In certain embodiments, the crosslinkable polymer is a photo-crosslinkable styrene-containing copolymer.

In certain embodiments, the crosslinkable polymer is a crosslinkable PTC polymer. In certain embodiments, the crosslinkable PTC polymer is a crosslinkable polyethylene, a crosslinkable polypropylene, or a mixture thereof. In certain embodiments, the crosslinkable PTC polymer is a crosslinkable high-density polyethylene, a crosslinkable low-density polyethylene, a crosslinkable high-density polypropylene, a crosslinkable low-density polypropylene, or a mixture thereof.

In one embodiment, the crosslinkable polymer is a polyamide-imide, polyimide, or a mixture thereof. In certain embodiments, the polyamide-imide is aromatic, aliphatic, cycloaliphatic, or a mixture thereof. In certain embodiments, the polyamide-imide is an aromatic polyamide-imide. In certain embodiments, the polyamide-imide is an aliphatic polyamide-imide. In certain embodiments, the polyamide-imide is a cycloaliphatic polyamide-imide. In certain embodiments, the polyimide is aromatic, aliphatic, cycloaliphatic, or a mixture thereof. In certain embodiments, the polyimide is an aromatic polyimide. In certain embodiments, the polyimide is an aliphatic polyimide. In certain embodiments, the polyimide is a cycloaliphatic polyimide.

In certain embodiments, the crosslinkable polymer is TORLON® AI-30, TORLON® AI-50, TORLON® 4000, TORLON® 4203L, or a mixture thereof (Solvay Advanced Polymers, L.L.C., Ao0yaretta, GA). In certain embodiments, the crosslinkable polymer is TORLON® AI-30. In certain embodiments, the crosslinkable polymer is TORLON® AI-50. In certain embodiments, the crosslinkable polymer is TORLON® 4000. In certain embodiments, the crosslinkable polymer is TORLON® 4203L.

Example of suitable polyamide-imide and polyimides include those described in Loncrini and Witzel, *Journal of Polymer Science Part A-1: Polymer Chemistry* 1969, 7, 2185-2193; Jeon and Tak, *Journal of Applied Polymer Science* 1996, 60, 1921-1926; Seino et al., *Journal of Polymer Science Part A: Polymer Chemistry* 1999, 37, 3584-3590; Seino et al., *High Performance Polymers* 1999, 11, 255-262; Matsumoto, *High Performance Polymers* 2001, 13, S85-S92; Schab-Balcerzak et al., *European Polymer Journal* 2002, 38, 423-430; Eichstadt et al., *Journal of Polymer Science Part B: Polymer Physics* 2002, 40, 1503-1512; and Fang et al., *Polymer* 2004, 45, 2539-2549; the disclosure of each of which is incorporated herein by reference in its entirety.

In certain embodiments, the precursors of the crosslinked polyamide-imide are a polyanhydride and polyamine. In certain embodiments, the crosslinked polyamide-imide is formed from a polyanhydride and a polyamine via polymerization in the presence of an inorganic PTC compound, in one embodiment, particles of the inorganic PTC compound.

In certain embodiments, the precursors of the crosslinked polyimide are a polyanhydride and polyamine. In certain embodiments, the crosslinked polyimide is formed from a polyanhydride and a polyamine via polymerization in the presence of an inorganic PTC compound, in one embodiment, particles of the inorganic PTC compound.

Suitable polyanhydrides, polyamines, polyamide-imide, and polyimides include those described in Eur. Pat. App. Pub. Nos. EP 0450549 and EP 1246280; U.S. Pat. No. 5,504,128; and U.S. Pat. App. Pub. Nos. 2006/0099506 and 2007/0269718, the disclosure of each of which is incorporated herein by reference in its entirety.

Suitable polyanhydrides include, but are not limited to, butanetetracarboxylic dianhydride, meso-1,2,3,4-butanetetracarboxylic dianhydride, dl-1,2,3,4-butanetetracarboxylic dianhydride, cyclobutane tetracarboxylic dianhydride, 1,2,3,4-cyclopentane tetracarboxylic dianhydride, cyclohexane tetracarboxylic dianhydride, 1,2,3,4-cyclohexanetetracarboxylic dianhydride, cis-1,2,3,4-cyclohexanetetracarboxylic dianhydride, trans-1,2,3,4-cyclohexanetetracarboxylic dianhydride, bicyclo[2.2.2]octane-2,3,5,6-tetracarboxylic 2,3:5,6-dianhydride, bicyclo[2.2.2]oct-7-ene-2,3,5,6-tetracarboxylic dianhydride, bicyclo[2.2.1]-heptane-2,3,5,6-tetracarboxylic 2,3:5,6-dianhydride, (4arH, 8acH)-decahydro-1,t,4t:5c,4-cyclohexene-1,1,2,2-tetracarboxylic 1,2:1,2-dianhydride, bicyclo[2.2.1]heptane-2-exo-3-exo-5-exo-tricarboxyl-5-endo-acetic dianhydride, bicyclo[4.2.0]oxetane-1,6,7,8-tetracarboxylic acid intramolecular dianhydride, 3,3',4,4'-diphenylsulfonetetracarboxylic dianhydride, 4,4'-hexafluoropropylidene bisphthalic dianhydride, 1,3-bis(3,4-dicarboxyphenyl)-1,1,3,3-tetramethyldisiloxane, and combinations thereof.

Suitable polyamines include, but are not limited to, 4,4'-methylenebis(2,6-dimethylaniline), 4,4'-oxydianiline, m-phenylenediamine, p-phenylenediamine, benzidene, 3,5-diaminobenzoic acid, o-dianisidine, 4,4'-diaminodiphenyl methane, 4,4'-methylenebis(2,6-dimethylaniline), 1,4-diaminobutane, 1,6-diaminohexane, 1,7-diaminoheptane, 1,9-diaminononane, 1,10-diaminodecane, 1,12-diaminododecane, 5-amino-1,3,3-trimethylcyclohexanemethylamine, 2,5-bis(aminomethyl)bicyclo[2.2.1]heptane, 2,6-bis(aminomethyl)bicyclo[2.2.1]heptane, 2,4-diaminotoluene, 1,4-diamino-2-methoxybenzene, 1,4-diamino-2-phenylbenzene and 1,3-diamino-4-chlorobenzene, 4,4'-diaminobiphenyl, 2,2-bis(4-aminophenyl)propane, 2,2-bis[4-(4-aminophenoxy)phenyl]propane, 2,2-bis(4-aminophenyl)-1,1,1,3,3,3-hexafluoropropane, 2,2-bis(4-aminophenoxyphenyl) hexafluoropropane, 4,4'-diaminodiphenyl ether, 3,4-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl] propane, 2,2-bis[4-(4-aminophenoxy)phenyl]-1,1,1,3,3,3-hexafluoropropane, 4,4'-diaminodiphenyl thioether, 4,4'-diaminodiphenyl sulfone, 2,2'-diaminobenzophenone, 3,3'-diaminobenzophenone, naphthalene diamines (including 1,8-diaminonaphthalene and 1,5-diaminonaphthalene), 2,6-diaminopyridine, 2,4-diaminopyrimidine, 2,4-diamino-s-triazine, 1,8-diamino-4-(aminomethyl)octane, bis[4-(4-aminophenoxy)-phenyl]sulfone, 3,3'-dihydroxy-4,4'-diaminobiphenyl, 2,2-bis(3-amino-4-hydroxyphenyl) hexafluoropropane, 2,2-bis(3-hydroxy-4-aminophenyl) propane, and combinations thereof.

In certain embodiments, the crosslinked polymer is a polyimide formed from U-VARNISH® (UBE American Inc., New York, N.Y.).

In certain embodiments, the PTC film comprises no less than about 50%, no less than about 55%, no less than about 60%, no less than about 65%, no less than about 70%, no less than about 75%, no less than about 80%, no less than about 85%, no less than about 90%, or no less than about 95% by weight of the inorganic PTC compound. In certain embodiments, the PTC film comprises no less than about 60%, no less than about 65%, no less than about 70%, no less than about 75%, no less than about 80%, no less than about 85%, or no less than about 90% by weight of the inorganic PTC compound. In certain embodiments, the PTC film comprises about 50%, about 55%, about 60%, about 65%, about 70%, about 75%, about 80%, about 85%, about 90%, or about 95% by weight of the inorganic PTC compound. In certain embodiments, the PTC film comprises about 70%, about 75%, about 80%, about 85%, about 90%, or about 95% by weight of the inorganic PTC compound.

In certain embodiments, the PTC film comprises no greater than about 50%, no greater than about 45%, no greater than about 40%, no greater than about 35%, no greater than about 30%, no greater than about 25%, no greater than about 20%, no greater than about 15%, no greater than about 10%, or no greater than about 5% by weight of the crosslinked polymer. In certain embodiments, the PTC film comprises no greater than about 40%, no greater than about 35%, no greater than about 30%, no greater than about 25%, no greater than about 20%, no greater than about 15%, or no greater than about 10% by weight of the crosslinked polymer. In certain embodiments, the PTC film comprises about 50%, about 45%, about 40%, about 35%, about 30%, about 25%, about 20%, about 15%, about 10%, or about 5% by weight of the crosslinked polymer. In certain embodiments, the PTC film comprises about 35%, about 30%, about 25%, about 20%, about 15%, about 10%, or about 5% by weight of the crosslinked polymer.

In certain embodiments, the PTC film comprises no less than about 50% by weight of the inorganic PTC compound and no greater than about 50% by weight of the crosslinked polymer. In certain embodiments, the PTC film comprises no less than about 55% by weight of the inorganic PTC compound and no greater than about 45% by weight of the crosslinked polymer. In certain embodiments, the PTC film comprises no less than about 60% by weight of the inorganic PTC compound and no greater than about 40% by weight of the crosslinked polymer. In certain embodiments, the PTC film comprises no less than about 65% by weight of the inorganic PTC compound and no greater than about 35% by weight of the crosslinked polymer. In certain embodiments, the PTC film comprises no less than about 70% by weight of the inorganic PTC compound and no greater than about 30% by weight of the crosslinked polymer. In certain embodiments, the PTC film comprises no less than about 75% by weight of the inorganic PTC compound and no greater than about 25% by weight of the crosslinked polymer. In certain embodiments, the PTC film comprises no less than about 80% by weight of the inorganic PTC compound and no greater than about 20% by weight of the crosslinked polymer. In certain embodiments, the PTC film comprises no less than about 85% by weight of the inorganic PTC compound and no greater than about 15% by weight of the crosslinked polymer. In certain embodiments, the PTC film comprises no less than about 90% by weight of the inorganic PTC compound and no greater than about 10% by weight of the crosslinked polymer. In certain embodiments, the PTC film comprises no less than about 95% by weight of the inorganic PTC compound and no greater than about 5% by weight of the crosslinked polymer.

In certain embodiments, the PTC film has a thickness ranging from about 100 nm to about 200 µm, from about 500 nm to about 100 µm, from about 1 to about 100 µm, from about 1 to about 50 µm, from about 2 to about 50 µm, from about 5 to about 50 µm, from about 10 to about 50 µm, or from about 10 to about 50 µm. In certain embodiments, the PTC film has a thickness of about 2, about 5, about 10, about 20, about 30, about 40, or about 50 µm.

In certain embodiments, the PTC film has a two-dimensional density ranging from about 0.01 to about 100 mg/cm$^2$, from about 0.05 to about 50 mg/cm$^2$, from about 0.1 to about 25 mg/cm$^2$, from about 0.2 to about 10 mg/cm$^2$, from about 0.5 to about 5 mg/cm$^2$, from about 0.5 to about 5 mg/cm$^2$, or from about 0.5 to about 2 mg/cm$^2$. In certain embodiments, the PTC film has a loading of about 0.1 mg/cm$^2$, about 0.25 mg/cm$^2$, about 0.5 mg/cm$^2$, about 1 mg/cm$^2$, about 1.5 mg/cm$^2$, about 2 mg/cm$^2$, or about 5 mg/cm$^2$.

In one embodiment, the PTC film comprises barium titanate and a crosslinked polyamide-imide. In another embodiment, the PTC film comprises no less than about 50% by weight of barium titanate and no greater than about 50% by weight of the crosslinked polyamide-imide. In yet another embodiment, the PTC film comprises no less than about 60% by weight of barium titanate and no greater than about 40% by weight of the crosslinked polyamide-imide. In yet another embodiment, the PTC film comprises no less than about 70% by weight of barium titanate and no greater than about 30% by weight of the crosslinked polyamide-imide. In yet another embodiment, the PTC film comprises no less than about 75% by weight of barium titanate and no greater than about 25% by weight of the crosslinked polyamide-imide. In yet another embodiment, the PTC film comprises no less than about 80% by weight of barium titanate and no greater than about 20% by weight of the crosslinked polyamide-imide. In still another embodiment, the PTC film comprises no less than about 85% by weight of barium titanate and no greater than about 15% by weight of the crosslinked polyamide-imide.

In one embodiment, the PTC film comprises about 70% by weight of barium titanate and about 30% by weight of the crosslinked polyamide-imide. In another embodiment, the PTC film comprises about 75% by weight of barium titanate and about 25% by weight of the crosslinked polyamide-imide. In yet another embodiment, the PTC film comprises about 80% by weight of barium titanate and about 20% by weight of the crosslinked polyamide-imide. In yet another embodiment, the PTC film comprises about 85% by weight of barium titanate and about 15% by weight of the crosslinked polyamide-imide. In yet another embodiment, the PTC film comprises about 90% by weight of barium titanate and about 10% by weight of the crosslinked polyamide-imide. In still another embodiment, the PTC film comprises about 95% by weight of barium titanate and about 5% by weight of the crosslinked polyamide-imide.

In one embodiment, the PTC film comprises barium titanate and a crosslinked polypropylene. In another embodiment, the PTC film comprises no less than about 50% by weight of barium titanate and no greater than about 50% by weight of the crosslinked polypropylene. In yet another embodiment, the PTC film comprises no less than about 60% by weight of barium titanate and no greater than about 40% by weight of the crosslinked polypropylene. In yet another embodiment, the PTC film comprises no less than about 70% by weight of barium titanate and no greater than about 30% by weight of the crosslinked polypropylene. In yet another embodiment, the PTC film comprises no less than about 75% by weight of barium titanate and no greater than about 25% by weight of the crosslinked polypropylene. In yet another embodiment, the PTC film comprises no less than about 80% by weight of barium titanate and no greater than about 20% by weight of the crosslinked polypropylene. In yet another embodiment, the PTC film comprises no less than about 85% by weight of barium titanate and no greater than about 15% by weight of the crosslinked polypropylene.

In one embodiment, the PTC film comprises about 70% by weight of barium titanate and about 30% by weight of the crosslinked polypropylene. In another embodiment, the PTC film comprises about 75% by weight of barium titanate and about 25% by weight of the crosslinked polypropylene. In yet another embodiment, the PTC film comprises about 80% by weight of barium titanate and about 20% by weight of the crosslinked polypropylene. In yet another embodiment, the PTC film comprises about 85% by weight of barium titanate and about 15% by weight of the crosslinked polypropylene. In yet another embodiment, the PTC film comprises about 90% by weight of barium titanate and about 10% by weight of the crosslinked polypropylene. In still another embodiment, the PTC film comprises about 95% by weight of barium titanate and about 5% by weight of the crosslinked polypropylene.

In certain embodiments, the PTC film further comprises a conductive material, a phase transition material, and/or a fireretardant material. Suitable phase transition materials include, but are not limited to, paraffin, PEG, paraffin wax, and dry organic materials. Suitable fireretardant materials include, but are not limited to, (i) inorganic compounds that can release $CO_2$, e.g., $Li_2CO_3$, $CaCO_3$, and $Na_2CO_3$; (ii) borates, e.g., $Mg_2B_2O_5$ and $Li_6B_4O_9$; and (iii) orgranophosphates, e.g., triphenyl phosphate and bisphenol A diphenyl phosphate (BADP).

In certain embodiments, the PTC film further comprises a conductive material. Thus, in one embodiment, provided herein is a PTC film comprising (i) an inorganic PTC compound, in one embodiment, particles of the inorganic PTC compound; (ii) a crosslinked polymer; and (iii) a conductive material, in one embodiment, particles of the conductive material.

In certain embodiments, the conductive material is carbon. In certain embodiments, the conductive material is acetylene black, ketjen black, furnace black, lamp black, carbon, disordered carbon, carbon black, graphite, graphene, a carbon nanotube, a single-walled nanotube, a multi-wall nanotube, a carbon fiber, or a mixture thereof. In certain embodiments, the conductive material is carbon black.

In certain embodiments, the conductive material is a metal, in one embodiment, metal particles. In certain embodiments, the conductive material is aluminum, chromium, copper, cobalt, gold, iron, lead, molybdenum, nickel, platinum, silver, titanium, tungsten, or a combination thereof.

In certain embodiments, the conductive material is a conductive polymer. In certain embodiments, the conductive material is polythiophene, poly(3-hexylthiophene), poly(2-acetylthiophene), polybenzothiopnene, poly(2,5-dimethylthiophene), poly(2-ethylthiophene), poly(3-carboxylic ethyl thiophene), polythiopheneacetonitrile, poly(3,4-ethylenedioxythiophene), polyisothianaphthene, polypyrrole, polyaniline, polyparaphenylene, or a combination thereof.

The conductive material used herein is not limited by its shape. In certain embodiments, the conductive material is sphere, fibril, fiber, or platelet.

In certain embodiments, the PTC film comprises no greater than about 20%, no greater than about 10%, no greater than about 5%, no greater than about 4%, no greater than about 3%, no greater than about 2%, or no greater than about 1% by weight of the conductive material. In certain embodiments, the PTC film comprises about 1%, about 2%, about 3%, about 4%, or about 5% by weight of the conductive material. In certain embodiments, the PTC film comprises about 1% by weight of the conductive material.

In certain embodiments, the PTC film comprises no less than about 50% by weight of the inorganic PTC compound, no greater than about 50% by weight of the crosslinked polymer, and no greater than about 5% by weight of the conductive material. In certain embodiments, the PTC film comprises no less than about 55% by weight of the inorganic PTC compound, no greater than about 45% by weight of the crosslinked polymer, and no greater than about 5% by weight of the conductive material. In certain embodiments, the PTC film comprises no less than about 60% by weight of the inorganic PTC compound, no greater than about 40% by weight of the crosslinked polymer, and no greater than about 5% by weight of the conductive material. In certain embodiments, the PTC film comprises no less than about 65% by weight of the inorganic PTC compound, no greater than about 35% by weight of the crosslinked polymer, and no greater than about 5% by weight of the conductive material. In certain embodiments, the PTC film comprises no less than about 70% by weight of the inorganic PTC compound, no greater than about 30% by weight of the crosslinked polymer, and no greater than about 5% by weight of the conductive material. In certain embodiments, the PTC film comprises no less than about 75% by weight of the inorganic PTC compound, no greater than about 25% by weight of the crosslinked polymer, and no greater than about 5% by weight of the conductive material. In certain embodiments, the PTC film comprises no less than about 80% by weight of the inorganic PTC compound, no greater than about 20% by weight of the crosslinked polymer, and no greater than about 5% by weight of the conductive material. In certain embodiments, the PTC film comprises no less than about 85% by weight of the inorganic PTC compound, no greater than about 15% by weight of the crosslinked polymer, and no greater than about 5% by weight of the conductive material. In certain embodiments, the PTC film comprises no less than about 90% by weight of the inorganic PTC compound, no greater than about 10% by weight of the crosslinked polymer, and no greater than about 2% by weight of the conductive material. In certain embodiments, the PTC film comprises no less than about 95% by weight of the inorganic PTC compound, no greater than about 5% by weight of the crosslinked polymer, and no greater than about 2% by weight of the conductive material.

In one embodiment, the PTC film comprises barium titanate, a crosslinked polyamide-imide, and carbon black. In another embodiment, the PTC film comprises no less than about 50% by weight of barium titanate, no greater than about 50% by weight of the crosslinked polyamide-imide, and no greater than about 5% of carbon black. In yet another embodiment, the PTC film comprises no less than about 60% by weight of barium titanate, no greater than about 40% by weight of the crosslinked polyamide-imide, and no greater than about 5% of carbon black. In yet another embodiment, the PTC film comprises no less than about 70% by weight of barium titanate, no greater than about 30% by weight of the crosslinked polyamide-imide, and no greater than about 5% of carbon black. In yet another embodiment, the PTC film comprises no less than about 75% by weight of barium titanate, no greater than about 25% by weight of the crosslinked polyamide-imide, and no greater than about 5% of carbon black. In yet another embodiment, the PTC film comprises no less than about 80% by weight of barium titanate, no greater than about 20% by weight of the crosslinked polyamide-imide, and no greater than about 2% of carbon black. In still another embodiment, the PTC film comprises no less than about 85% by weight of barium titanate, no greater than about 15% by weight of the crosslinked polyamide-imide, and no greater than about 2% of carbon black.

In one embodiment, the PTC film comprises barium titanate, a crosslinked polypropylene, and carbon black. In another embodiment, the PTC film comprises no less than about 50% by weight of barium titanate, no greater than about 50% by weight of the crosslinked polypropylene, and no greater than about 5% of carbon black. In yet another embodiment, the PTC film comprises no less than about 60% by weight of barium titanate, no greater than about 40% by weight of the crosslinked polypropylene, and no greater than about 5% of carbon black. In yet another embodiment, the PTC film comprises no less than about 70% by weight of barium titanate, no greater than about 30% by weight of the crosslinked polypropylene, and no greater than about 5% of carbon black. In yet another embodiment, the PTC film comprises no less than about 75% by weight of barium titanate, no greater than about 25% by weight of the crosslinked polypropylene, and no greater than about 5% of carbon black. In yet another embodiment, the PTC film comprises no less than about 80% by weight of barium titanate, no greater than about 20% by weight of the crosslinked polypropylene, and no greater than about 2% of carbon black. In still another embodiment, the PTC film comprises no less than about 85% by weight of barium titanate, no greater than about 15% by weight of the crosslinked polypropylene, and no greater than about 2% of carbon black.

In certain embodiments, the PTC film further comprises a filler. Thus, in one embodiment, provided herein is a PTC film comprising (i) an inorganic PTC compound, in one embodiment, particles of the inorganic PTC compound; (ii) a crosslinked polymer; (iii) a conductive material, in one embodiment, particles of the conductive material; and (iv) a filler, in one embodiment, a binder.

In certain embodiments, the filler is asphalt pitch, pitch coke, petroleum coke, a sugar (e.g., sucrose), coal tar, fluoranthene, pyrene, chrysene, phenanthrene, anthracene, naphthalin, fluorene, biphenyl, acenephthene, a solid ionic conductor, a polyamide-imide, a polyimide, polytetrafluoroethylene (PTFE), CMC, polyvinylidene fluoride (PVDF), polyvinyl alcohol (PVA), styrene butadiene rubber (SBR), or a mixture thereof. In certain embodiments, the filler is a polymer. In certain embodiments, the polymeric filler is a polyamide-imide, a polyimide, PTFE, CMC, PVDF, PVA, SBR, or a mixture thereof. In certain embodiments, the filler is PVDF, SBR, or a mixture thereof. In certain embodiments, the filler is PVDF. In certain embodiments, the filler is SBR.

In certain embodiments, the PTC film comprises no greater than about 50%, no greater than about 40%, no greater than about 30%, no greater than about 25%, no greater than about 20%, no greater than about 15%, no greater than about 10%, or no greater than about 5% by weight of the filler. In certain embodiments, the PTC film comprises about 30%, about 25%, about 20%, about 15%, about 10%, or about 5% by weight of the filler. In certain embodiments, the PTC film comprises about 5%, about 5.5%, about 6%, about 6.5%, about 7.5%, about 8%, about 8.5%, about 9%, about 9.5%, or 10% by weight of the filler.

In certain embodiments, the PTC film comprises no less than about 50% by weight of the inorganic PTC compound, no greater than about 50% by weight of the crosslinked polymer, no greater than about 5% by weight of the conductive material, and no greater than about 30% by weight of the filler. In certain embodiments, the PTC film comprises no less than about 55% by weight of the inorganic PTC compound, no greater than about 45% by weight of the crosslinked polymer, no greater than about 5% by weight of the conductive material, and no greater than about 10% by weight of the filler. In certain embodiments, the PTC film comprises no less than about 60% by weight of the inorganic PTC compound, no greater than about 40% by weight of the crosslinked polymer, no greater than about 5% by weight of the conductive material, and no greater than about 10% by weight of the filler. In certain embodiments, the PTC film comprises no less than about 65% by weight of the inorganic PTC compound, no greater than about 35% by weight of the crosslinked polymer, no greater than about 5% by weight of the conductive material, and no greater than about 10% by weight of the filler. In certain embodiments, the PTC film comprises no less than about 70% by weight of the inorganic PTC compound, no greater than about 30% by weight of the crosslinked polymer, no greater than about 5% by weight of the conductive material, and no greater than about 10% by weight of the filler. In certain embodiments, the PTC film comprises no less than about 75% by weight of the inorganic PTC compound, no greater than about 25% by weight of the crosslinked polymer, no greater than about 5% by weight of the conductive material, and no greater than about 10% by weight of the filler. In certain embodiments, the PTC film comprises no less than about 80% by weight of the inorganic PTC compound, no greater than about 20% by weight of the crosslinked polymer, no greater than about 5% by weight of the conductive material, and no greater than about 10% by weight of the filler. In certain embodiments, the PTC film comprises no less than about 85% by weight of the inorganic PTC compound, no greater than about 15% by weight of the crosslinked polymer, no greater than about 5% by weight of the conductive material, and no greater than about 10% by weight of the filler. In certain embodiments, the PTC film comprises no less than about 90% by weight of the inorganic PTC compound, no greater than about 10% by weight of the crosslinked polymer, no greater than about 2% by weight of the conductive material, and no greater than about 10% by weight of the filler. In certain embodiments, the PTC film comprises no less than about 95% by weight of the inorganic PTC compound, no greater than about 5% by weight of the crosslinked polymer, no greater than about 2% by weight of the conductive material, and no greater than about 10% by weight of the filler.

In one embodiment, the PTC film comprises barium titanate, a crosslinked polyamide-imide, carbon black, and CMC and/or SBR. In another embodiment, the PTC film comprises no less than about 50% by weight of barium titanate, no greater than about 50% by weight of the crosslinked polyamide-imide, no greater than about 5% by weight of carbon black, and no greater than about 30% by weight of CMC and SBR. In yet another embodiment, the PTC film comprises no less than about 60% by weight of barium titanate, no greater than about 40% by weight of the crosslinked polyamide-imide, no greater than about 5% by weight of carbon black, and no greater than about 10% by weight of CMC and SBR. In yet another embodiment, the PTC film comprises no less than about 70% by weight of barium titanate, no greater than about 30% by weight of the crosslinked polyamide-imide, no greater than about 5% by weight of carbon black, and no greater than about 10% by weight of CMC and SBR. In yet another embodiment, the PTC film comprises no less than about 75% by weight of barium titanate, no greater than about 25% by weight of the crosslinked polyamide-imide, no greater than about 5% by weight of carbon black, and no greater than about 10% by weight of CMC and SBR. In yet another embodiment, the PTC film comprises no less than about 80% by weight of barium titanate, no greater than about 20% by weight of the crosslinked polyamide-imide, no greater than about 2% by weight of carbon black, and no greater than about 10% by weight of CMC and SBR. In still another embodiment, the PTC film comprises no less than about 85% by weight of barium titanate, no greater than about 15% by weight of the crosslinked polyamide-imide, no greater than about 2% by weight of carbon black, and no greater than about 10% by weight of CMC and SBR.

In one embodiment, the PTC film comprises barium titanate, a crosslinked polypropylene, carbon black, and CMC or SBR. In another embodiment, the PTC film comprises no less than about 50% by weight of barium titanate, no greater than about 50% by weight of the crosslinked polypropylene, no greater than about 5% by weight of carbon black, and no greater than about 30% by weight of CMC and SBR. In yet another embodiment, the PTC film comprises no less than about 60% by weight of barium titanate, no greater than about 40% by weight of the crosslinked polypropylene, no greater than about 5% by weight of carbon black, and no greater than about 10% by weight of CMC and SBR. In yet another embodiment, the PTC film comprises no less than about 70% by weight of barium titanate, no greater than about 30% by weight of the crosslinked polypropylene, no greater than about 5% by weight of carbon black, and no greater than about 10% by weight of CMC and SBR. In yet another embodiment, the PTC film comprises no less than about 75% by weight of barium titanate, no greater than about 25% by weight of the crosslinked polypropylene, no greater than about 5% by weight of carbon black, and no greater than about 10% by weight of CMC and SBR. In yet another embodiment, the PTC film comprises no less than about 80% by weight of barium titanate, no greater than about 20% by weight of the crosslinked polypropylene, no greater than about 2% by weight of carbon black, and no greater than about 10% by weight of CMC and SBR. In still another embodiment, the PTC film comprises no less than about 85% by weight of barium titanate, no greater than about 15% by weight of the crosslinked polypropylene, no greater than about 2% by weight of carbon black, and no greater than about 10% by weight of CMC and SBR.

In another embodiment, provided herein is a PTC film comprising no less than about 70% by weight of an inorganic PTC compound, in one embodiment, particles of the inorganic PTC compound, and no greater than about 30% by weight of one or more polymers. In one embodiment, the PTC film provided herein comprises no less than about 75% by weight of an inorganic PTC compound and no greater than about 25% by weight of one or more polymers. In another embodiment, the PTC film provided herein comprises no less than about 80% by weight of an inorganic PTC compound and no greater than about 20% by weight of one or more polymers. In yet another embodiment, the PTC film provided herein comprises no less than about 85% by weight of an inorganic PTC compound and no greater than about 15% by weight of one or more polymers. In yet another embodiment, the PTC film provided herein comprises no less than about 90% by weight of an inorganic PTC compound and no greater than about 10% by weight of one or more polymers. In still another embodiment, the PTC film provided herein comprises no less than about 95% by weight of an inorganic PTC compound and no greater than about 5% by weight of one or more polymers.

In certain embodiments, the polymer is a polybenzophenone, polyacrylate, polyvinyl, polypropylene, polystyrene, polysulfone, 2,3-dihydrofuran-containing polymer, CMC, polyamide-imide, polyimide, styrene-containing copolymer, PTFE, PVDF, PVA, SBR, polyethylene, polypropylene, or a combination thereof.

In certain embodiments, the polymer is a polybenzophenone, polyacrylate, polyvinyl, polypropylene, polystyrene, polysulfone, 2,3-dihydrofuran-containing polymer, CMC, polyamide-imide, polyimide, styrene-containing copolymer, PTFE, PVDF, PVA, SBR, or a combination thereof.

In certain embodiments, the polymer is a PTC polymer. In certain embodiments, the PTC polymer is a polyethylene or polypropylene. In certain embodiments, the PTC polymer is high-density polyethylene or low density polyethylene. In certain embodiments, the PTC polymer is high-density polypropylene or low density polypropylene.

In certain embodiments, the polymer is a crosslinked polymer. In certain embodiments, the crosslinked polymer is a crosslinkable polymer.

In one embodiment, the PTC film provided herein comprises no less than about 70% by weight of barium titanate and no greater than about 30% by weight of PVDF, polyamide-imide, polypropylene, SBR, CMC, or a mixture thereof. In another embodiment, the PTC film provided herein comprises no less than about 75% by weight of barium titanate and no greater than about 25% by weight of PVDF, polyamide-imide, polypropylene, SBR, CMC, or a mixture thereof. In yet another embodiment, the PTC film provided herein comprises no less than about 80% by weight of barium titanate and no greater than about 20% by weight of PVDF, polyamide-imide, polypropylene, SBR, CMC, or a mixture thereof. In yet another embodiment, the PTC film provided herein comprises no less than about 85% by weight of barium titanate and no greater than 15% by weight of PVDF, polyamide-imide, polypropylene, SBR, CMC, or a mixture thereof. In yet another embodiment, the PTC film provided herein comprises no less than about 90% by weight of barium titanate and no greater than 10% by weight of PVDF, polyamide-imide, polypropylene, SBR, CMC, or a mixture thereof. In still another embodiment, the PTC film provided herein comprises no less than about 95% by weight of barium titanate and no greater than 5% by weight of PVDF, polyamide-imide, polypropylene, SBR, CMC, or a mixture thereof.

In certain embodiments, the PTC film provided herein further comprises a conductive material as described herein. Thus, in one embodiment, provided herein is a PTC film comprising (i) no less than about 70% by weight of an inorganic PTC compound, in one embodiment, particles of the inorganic PTC compound; (ii) no greater than about 30% by weight of one or more polymers; and (iii) no greater than about 5% by weight of a conductive material, in one embodiment, particles of the conductive material. In another embodiment, the PTC film provided herein comprises no less than about 75% by weight of an inorganic PTC compound, no greater than about 25% by weight of one or more polymers, and no greater than about 5% by weight of a conductive material. In yet another embodiment, the PTC film provided herein comprises no less than about 80% by weight of an inorganic PTC compound, no greater than about 20% by weight of one or more polymers, and no greater than about 5% by weight of a conductive material. In yet another embodiment, the PTC film provided herein comprises no less than about 85% by weight of an inorganic PTC compound, no greater than about 15% by weight of one or more polymers, and no greater than about 5% by weight of a conductive material. In yet another embodiment, the PTC film provided herein comprises no less than about 90% by weight of an inorganic PTC compound, no greater than about 10% by weight of one or more polymers, and no greater than about 5% by weight of a conductive material. In still another embodiment, the PTC film provided herein comprises no less than about 95% by weight of an inorganic PTC compound, no greater than 5% by weight of one or more polymers, and no greater than about 5% by weight of a conductive material.

In yet another embodiment, provided herein is a PTC film comprising an inorganic PTC compound, one or more polymers, and optionally a conductive material; wherein the PTC film is formed using a mixture of the inorganic PTC compound, the polymer(s), and optionally the conductive material in water as a solvent.

In yet another embodiment, provided herein is a method for preparing a PTC film that comprises an inorganic PTC compound, a crosslinked polymer, optionally a conductive material, and optionally a filler; comprising the steps of:

(i) coating a mixture, in one embodiment, a slurry, of the inorganic PTC compound, the crosslinked polymer, optionally the conductive material, and optionally the filler in a solvent onto at a flat surface to form a wet PTC film; and (ii) curing the crosslinking the wet PTC film to form the PTC film.

In yet another embodiment, provided herein is a method for preparing a PTC film that comprises an inorganic PTC compound, a crosslinked polymer, optionally a conductive material, and optionally a filler; comprising the steps of:

(i) coating a mixture, in one embodiment, a slurry, of the inorganic PTC compound, a precursor of the crosslinked polymer, in one embodiment, a crosslinkable polymer, optionally the conductive material, and optionally the filler in a solvent onto at a flat surface to form a wet PTC film; and (ii) curing the wet PTC film to crosslink the precursor to form the crosslinked polymer and thus to form the PTC film.

In certain embodiments, the solvent is a polar solvent. In certain embodiments, the solvent is an organic solvent. In certain embodiments, the solvent is a polar organic solvent. In certain embodiments, the solvent is an amide. In certain embodiments, the solvent is N-methylpyrrolidone (NMP). In certain embodiments, the solvent is water.

In certain embodiments, the flat surface is a surface of a metal film or foil. In certain embodiments, the flat surface is a surface of a current collector.

In certain embodiments, the mixture of the inorganic PTC compound and a precursor of the crosslinked polymer is a slurry or paste of particles of the inorganic PTC compound. In certain embodiments, the precursor of the crosslinked polymer is dissolved in the solvent.

In certain embodiments, the crosslinking step is performed by curing the mixture of the precursor and the inorganic PTC compound at an elevated temperature. In certain embodiments, the elevated temperature is ranging from about 100 to about 1,000° C., from about 150 to about 750° C., from about 200 to about 700° C., from about 300 to about 600° C., or from about 300 to about 500° C. In certain embodiments, the elevated temperature is about 200, about 250, about 300, about 350, about 400, about 450, about 500, about 550, or about 600° C.

In certain embodiments, the crosslinking step is performed by curing the mixture of the precursor and the inorganic PTC compound by removing the solvent, e.g., evaporation.

In still another embodiment, provided herein is a method for preparing a PTC film comprising an inorganic PTC compound, one or more polymers, and optionally a conductive material; wherein the method comprises the steps of:

(i) coating a mixture of the inorganic PTC compound, the polymer(s), and optionally the conductive material in water onto at a flat surface to form a wet PTC film; and (ii) curing, in one embodiment, drying, the wet film to form the PTC film.

In certain embodiments, the method provided herein further comprises the step of pressing the PTC film to reduce the thickness of the PTC film.

Positive Temperature Coefficient Electrodes

In one embodiment, provided herein is a PTC electrode comprising (i) a current collector having a surface; and (ii) one or more PTC films; and (iii) one or more electroactive material layers; wherein the PTC electrode has the same number of the PTC films as the electroactive material layers; wherein the PTC films are disposed as such that no two PTC films are in direct contact; and wherein one PTC film is disposed as such that the PTC film is in direct contact with the surface of the current collector, or one electroactive material layer is disposed as such that the electroactive material layer is in direct contact with the surface of the current collector. In one embodiment, one of the PTC films is in direct contact with the surface of the current collector. In another embodiment, one of the electroactive material layers is in direct contact with the surface of the current collector.

In one embodiment, provided herein is a PTC electrode comprising (i) a current collector; (ii) a PTC film; and (iii) an electroactive material layer.

In another embodiment, provided herein is a PTC electrode comprising (i) a current collector; (ii) a PTC film comprising an inorganic PTC compound, a polymer, and optionally a conductive material; and (ii) an electroactive material layer; wherein the PTC film is formed using a first solvent and the electroactive material layer is formed using a second solvent.

In certain embodiments, the first solvent is water. In certain embodiments, the second solvent is an organic solvent. In certain embodiments, the second solvent is an amide. In certain embodiments, the second solvent is NMP.

In yet another embodiment, provided herein is a PTC electrode comprising (i) a current collector; (ii) a ceramic PTC film comprising an inorganic PTC compound; and (iii) an electroactive material layer.

In certain embodiments, the PTC film is disposed between the current collector and the electroactive material layer. In certain embodiments, the electroactive material layer is disposed between the current collector and the PTC film.

In another embodiment, provided herein is a PTC electrode comprising (i) a current collector with a surface; and (ii) one or more PTC films; and (iii) one or more electroactive material layers; wherein the PTC electrode has one PTC film more than the number of the electroactive material layers on the surface of the current collector; wherein the PTC films are disposed as such that no two PTC films are in direct contact and each electroactive material layer is sandwitched between two PCT films; and wherein one PTC film is disposed as such that the PTC film is in direct contact with the surface of the current collector.

In still another embodiment, provided herein is a PTC electrode comprising (i) a current collector having a first and second surface; (ii) one or more positive temperature coefficient films on the first surface of the current collector and one or more positive temperature coefficient films on the second surface of the current collector; and (iii) one or more electroactive material layers on the first surface of the current collector and one or more electroactive material layers on the second surface of the current collector; wherein the electrode has the same number of the PTC films as the electroactive material layers on the first surface of the current collector; wherein the electrode has the same number of the PTC films as the electroactive material layers on the second surface of the current collector; wherein the electroactive films on each surface of the current collector are disposed as such that no two PTC films are in direct contact.

In one embodiment, one of the PTC films is in direct contact with the first surface of the current collector. In another embodiment, one of the electroactive material layers is in direct contact with the first surface of the current collector. In yet another embodiment, one of the PTC films is in direct contact with the second surface of the current collector. In still another embodiment, one of the electroactive material layers is in direct contact with the second surface of the current collector.

In certain embodiments, the PTC electrode has the same number of the PTC films on the first surface of the current collector as the PTC films on the second surface of the current collector.

In certain embodiments, the PTC electrode is a PTC anode. In certain embodiments, the PTC electrode is a PTC cathode.

In certain embodiments, the current collector is a metal. In certain embodiments, the current collector is aluminum, copper, nickel, silver, or a combination thereof. In certain embodiments, the current collector is a metal foil. In certain embodiments, the current collector is aluminum foil, copper foil, nickel foil, or silver foil, or a combination thereof.

In certain embodiments, the current collector for the anode is copper. In certain embodiments, the current collector for the anode is copper foil. In certain embodiments, the current collector for the anode is rolled copper foil. In certain embodiments, the current collector for the anode is electrodeposited copper foil.

In certain embodiments, the current collector for the cathode is aluminum, nickel, silver, or a combination thereof. In certain embodiments, the current collector for the cathode is aluminum foil, nickel foil, silver foil, graphite foil (e.g., GRAFOIL), or a combination thereof. In certain embodiments, the current collector for the cathode is aluminum foil. In certain embodiments, the current collector for the cathode is nickel foil. In certain embodiments, the current collector for the cathode is silver foil.

In certain embodiments, the electroactive material layer comprises an electroactive material and a binder. In certain embodiments, the binder is PVDF, CMC, SBR, a polyamide-imide, a polyimide, ethylene propylene diene monomer (EPDM), a polyethylene oxide (PEO or PEG), a polyethersulfone, a polyphenylsulfone, or a mixture thereof.

The electroactive material for the anode can be any electroactive material known to one of ordinary skill in the art.

In certain embodiments, the electroactive material for an anode is an electroactive metal or metal oxide. Suitable electroactive metals and metal oxides include, but are not limited to, silicon (Si), silicon monoxide (SiO), $Si_2N_2O$, $Ge_2N_2O$, boron oxide, titanium oxides (including titanium monoxide, titanium(III) oxide, and titanium dioxide), tin, tin oxides (including tin(II) oxide (SnO) and tin dioxide ($SnO_2$)), antimony, magnesium, zinc, zirconium oxide, cadmium, indium, aluminum, bismuth, germanium, lead, vanadium oxide, cobalt oxide, $WO_2$, and combinations thereof. In certain embodiments, the electroactive material for an anode is $Li_4Ti_5O_{12}$, $Si_{70}Fe_{10}Ti_{10}C_{10}$, $TiS_2$, $MoS_2$, or a combination thereof. In certain embodiments, the electroactive material for an anode is Si, SiO, $Li_4Ti_5O_{12}$, SnO, $WO_2$, $Si_{70}Fe_{10}Ti_{10}C_{10}$, $TiS_2$, $MoS_2$, $WS_2$, or a mixture thereof.

In certain embodiments, the electroactive material for an anode is an electroactive alloy. Suitable electrochemically active alloys include, but are not limited to, silicon alloys containing tin, a transition metal, and/or optionally carbon; silicon alloys containing a transition metal and/or aluminum; silicon alloys containing copper and/or silver; and alloys containing tin, silicon, aluminum, yttrium, a lanthanide, an actinide, or a combination thereof. In certain embodiments, the electrochemically active alloy is SnSb, SnAg, AgSi, GaSb, AlSb, InSb, $Sb_2Ti$, $Sb_2V$, $Sn_2Sn$, $Cu_2Sb$, $Cr_2Sb$, or a mixture thereof. In certain embodiments, the electrochemically active alloy is a multiple phase alloy, including, but not limited to, $Sn/SnSb_x$, $Sn/SnAg_x$, SnF/SnFeC, and SnMnC, wherein each x is independently greater than 0 but smaller than about 10, in one embodiment, about 0.1, about 0.2, about 0.5, about 1, about 2, about 3, about 4, about 5, about 6, about 7, about 8, about 9, or about 10. In certain embodiments, SnSb is $SnSb_{0.39}$. In certain embodiments, SnAg is $SnAg_{0.1}$, $SnAg_{0.32}$, $SnAg_{0.39}$, $SnAg_3$, or $SnAg_4$. In certain embodiments, the electroactive material for an anode is silicon. In certain embodiments, the silicon is doped with boron, aluminum, gallium, antimony, phosphorus, or a combination thereof. In certain embodiments, the electroactive material for an anode comprises silicon, in one embodiment, silicon powder, and carbon. In certain embodiments, the electroactive material for an anode is a mixture of silicon, in one embodiment, silicon powder, and carbon.

In certain embodiments, the electroactive material for the anode is carbon. In certain embodiments, the electroactive material for the anode is a carbonaceous material. In certain embodiments, the electroactive material for the anode is mesocarbon microbead. In certain embodiments, the carbonaceous material for the anode is graphene, graphite, coke, petroleum coke, carbon, a partially or fully graphitized carbon, carbon-black, hard carbon, or a mixture thereof.

In certain embodiments, the electroactive material for the anode is a coated electroactive particle. In certain embodiments, the electroactive material for the anode is coated silicon particle. In certain embodiments, the electroactive material for the anode is a silicon particle coated with a polymer. In certain embodiments, the electroactive material for the anode is a silicon particle coated with a crosslinked polymer.

In certain embodiments, the electroactive material for the anode is a silicon particle coated with a crosslinked polyamide-imide. In certain embodiments, the electroactive material for the anode is a silicon particle coated with a crosslinked polyimide. In certain embodiments, the electroactive material for the anode is a silicon particle coated with crosslinked CMC. In certain embodiments, the electroactive material for the anode is a silicon particle coated with crosslinked polysulfone.

The electroactive material for the cathode can be any electroactive material known to one of ordinary skill in the art.

In certain embodiments, the electroactive material for a cathode is a lithium compound. In one embodiment, the electroactive material for a cathode is a lithium phosphate compound. In another embodiment, the electroactive material for a cathode is $LiMPO_4$, wherein M is a transition metal. In certain embodiments, M is a transition metal selected from the group consisting of Ti, V, Cr, Mn, Fe, Co, and Ni. In yet another embodiment, the electroactive material for a cathode is $LiFePO_4$. In yet another embodiment, the electroactive material for a cathode is $LiMnPO_4$. In yet another embodiment, the electroactive material for a cathode is $LiVPO_4$. In yet another embodiment, the electroactive material for a cathode is $AM^a_{1-d}M^b_dPO_4$, wherein A is Li, Na, or a mixture thereof; $M^a$ is Fe, Co, Mn, or a mixture thereof; $M^b$ is Mg, Ca, Zn, Ni, Co, Cu, Al, B, Cr, Nb, or a mixture thereof and d is ranging from about 0.01 to about 0.99, from about 0.01 to about 0.5, from about 0.01 to about 0.30, or from about 0.01 to about 0.15. In yet another embodiment, the electroactive material for a cathode is $LiM^a_{1-d}M^b_dPO_4$, wherein $M^a$, $M^b$, and d are each as defined herein. In still another embodiment, the electroactive material for a cathode is $NaM^a_{1-d}M^b_dPO_4$, wherein $M^a$, $M^b$, and d are each as defined herein.

In certain embodiments, the electroactive material for a cathode is $(LiF)_xFe_{1-x}$, wherein $0<x<1$.

In certain embodiments, the electroactive material for a cathode is a metal oxide. In one embodiment, the electroactive material for a cathode is selected from the group consisting of $LiMn_2O_4$, $LiCoO_2$, $LiNiCoO_2$, $LiNi_cCo_{1-c}O_2$, where c is from about 0.05 to about 0.95, from about 0.1 to about 0.90, from about 0.2 to about 0.5, or from about 0.2 to about 0.4, $Li(NiMnCo)_{1/3}O_2$, $Li(NiMn)_{1/2}O_2$, $LiV_2O_5$, $LiAlNiCoO_2$, $LiNi_{1-a-b}Al_aCo_bO_2$, where a is from about 0.01 to about 0.5 and b is from about 0.01 to about 0.9, with the proviso that the sum of a and b is less than 1; and c is from about 0.01 to about 0.99, and mixtures thereof. In one embodiment, the electroactive material is $LiMn_2O_4$. In another embodiment, the electroactive material for a cathode is $LiCoO_2$. In yet another embodiment, the electroactive material for a cathode is $LiNiCoO_2$. In yet another embodiment, the electroactive material for a cathode is $LiNi_cCo_{1-c}O_2$, wherein c is from about 0.2 to about 0.5, from about 0.2 to about 0.4, or about 0.3. In yet another embodiment, the electroactive material for a cathode is $Li(NiMnCo)_{1/3}O_2$. In yet another embodiment, the electroactive material for a cathode is $Li(NiMn)_{1/2}O_2$. In yet another embodiment, the electroactive material for a cathode is $LiV_2O_5$. In still another embodiment, the electroactive material for a cathode is $LiAlNiCoO_2$.

In yet another embodiment, the electroactive material for a cathode is $LiNi_eMn_fCo_{1-e-f}O_2$, wherein e and f are each independently ranging from 0 to about 0.95, from about 0.01 to about 0.9, from about 0.05 to about 0.80, from about 0.1 to about 0.5, or from about 0.2 to about 0.4, and the sum of e and f is less than 1. In yet another embodiment, the electroactive material for a cathode is $LiNi_eMn_fCo_{1-e-f}O_2$, wherein e and f are 0.33.

In still another embodiment, the electroactive material for a cathode is $LiNi_{1-a-b}Al_aCo_bO_2$, wherein a is from about 0.01 to about 0.9, from about 0.01 to about 0.7, from about 0.01 to about 0.5, from about 0.01 to about 0.4, from about 0.01 to about 0.3, from about 0.01 to about 0.2, or from about 0.01 to about 0.1; and b is from about 0.01 to about 0.9, from about 0.01 to about 0.7, from about 0.01 to about 0.5, from about 0.01 to about 0.4, from about 0.01 to about 0.3, from about 0.01 to about 0.2, or from about 0.01 to about 0.1; with the proviso that the sum of a and b is less than 1. In certain embodiments, a is from about 0.01 to about 0.5. In certain embodiments, a is from about 0.01 to about 0.1. In certain embodiments, b is from about 0.01 to about 0.9. In certain embodiments, b is from about 0.01 to about 0.2. In certain embodiments, a is from about 0.01 to about 0.1 and b is from about 0.01 to about 0.2. In certain embodiments, the electroactive material for a cathode is $LiAl_{0.05}Ni_{0.8}Co_{0.15}O_2$. In certain embodiments, the electroactive material for a cathode is $Li_2FeSiO_4$, $Li_2MnSiO_4$, or a mixture thereof. In certain embodiments, the electroactive material for a cathode is $Li_2FeSiO_4$. In certain embodiments, the electroactive material for a cathode is $Li_2MnSiO_4$.

In certain embodiments, the electroactive material for the cathode is electroactive agglomerated particles. Examples of suitable electroactive agglomerated particles include those as described in U.S. Pat. App. Pub. No. 2008/0116423, the disclosure of which is incorporated herein by reference in its entirety.

In one embodiment, provided herein is a method for preparing a PTC electrode that comprises (a) a current collector having a surface; (b) a PTC film comprising an inorganic PTC compound, a crosslinked polymer, optionally a conductive material, and optionally a filler; and (c) an electroactive material layer; comprising the steps of:

(i) coating a mixture of the inorganic PTC compound, the crosslinked polymer, optionally the conductive material, and optionally the filler in a first solvent onto the surface of the current collector to form a web PTC film;

(ii) curing the wet PTC film to form the PTC film; and (iii) coating a mixture of the electroactive material in a second solvent onto the surface of the PTC film to form the electroactive material layer and thus to form the PTC electrode.

In another embodiment, provided herein is a method for preparing a PTC electrode that comprises (a) a current collector having a surface; (b) a PTC film comprising an inorganic PTC compound, a crosslinked polymer, optionally a conductive material, and optionally a filler; and (c) an electroactive material layer; comprising the steps of:

coating a mixture of the inorganic PTC compound, a precursor of the crosslinked polymer, in one embodiment, a crosslinkable polymer, optionally the conductive material, and optionally the filler, in a first solvent onto the surface of the current collector to form a wet PTC film;

(ii) curing the wet PTC film by crosslinking the precursor to form the crosslinked polymer and thus to form the PTC film; and (iii) coating a mixture of the electroactive material in a second solvent onto the surface of the PTC film to form the electroactive material layer and thus to form the PTC electrode.

In yet another embodiment, provided herein is a method for preparing a PTC electrode that comprises (a) a current collector having a surface; (b) a PTC film comprising an inorganic PTC compound, a polymer, and optionally a conductive material; and (c) an electroactive material layer; comprising the steps of:

(i) coating a mixture of the inorganic PTC compound, the polymer, and optionally the conductive material in a first solvent onto at the surface of the current collector to form the PTC film; and (ii) coating a mixture of the electroactive material in a second solvent onto the surface of the PTC film to form the electroactive material layer and thus to form the PTC electrode.

In certain embodiments, the first solvent is water. In certain embodiments, the second solvent is an organic solvent. In certain embodiments, the second solvent is an amide. In certain embodiments, the second solvent is NMP.

Positive Temperature Coefficient Separators

In one embodiment, provided herein is a PTC separator with a surface, comprising a separator and a PTC film, wherein the PTC film is in direct contact with the surface of the separator.

In another embodiment, provided herein is a PTC separator with a first and second surface, comprising a separator and two PTC films, wherein one PTC film is in direct contact with the first surface of the separator and the other PTC film is in direct contact with the second surface of the separator.

The separator can be any separator known to one of ordinary skill in the art.

In one embodiment, the separator is a plastic film. In certain embodiments, the separator is porous plastic film. In certain embodiments, the separator is microporous. In another embodiment, the separator is a polyolefin. In yet another embodiment, the separator is a polyethylene film, a polypropylene film, or a combination thereof.

Lithium Secondary Battery

In one embodiment, provided herein is a lithium secondary battery, which comprises (i) an anode; (ii) a cathode; (iii) a separator that separates the anode and cathode; and (iv) electrolyte; wherein at least one of the anode, cathode, and separator contains a PTC film provided herein.

In another embodiment, provided herein is a lithium secondary battery, which comprises (i) an anode; (ii) a cathode; (iii) a separator that separates the anode and cathode; and (iv) electrolyte; wherein at least one of the anode and cathode is a PTC electrode.

In another embodiment, the lithium secondary battery provided herein comprises (i) a PTC anode; (ii) a cathode; (iii) a separator that separates the anode and cathode; and (iv) electrolyte.

In yet another embodiment, the lithium secondary battery provided herein comprises (i) an anode; (ii) a PTC cathode; (iii) a separator that separates the anode and cathode; and (iv) electrolyte.

In yet another embodiment, the lithium secondary battery provided herein comprises (i) an anode; (ii) a cathode; (iii) a PTC separator that separates the anode and cathode; and (iv) electrolyte.

In still another embodiment, the lithium secondary battery provided herein comprises (i) a PTC anode; (ii) a PTC cathode; (iii) a PTC separator that separates the anode and cathode; and (iv) electrolyte.

The non-PTC anode, non-PTC cathode, and non-PTC separator can be any anode, cathode, separator known to one of ordinary skill in the art.

Any electrolytes known to one of ordinary skill in the art can be used in the batteries provided herein.

In certain embodiments, the electrolyte comprises one or more lithium salts and a charge carrying medium in the form of a solid, liquid, or gel. Suitable lithium salts include, but are not limited to $LiPF_6$, $LiBF_4$, $LiClO_4$, lithium bis(oxalato) borate, $LiN(CF_3SO_2)_2$, $LiN(C_2F_5SO_2)_2$, $LiAsF_6$, $LiC(CF_3SO_2)_3$, and combinations thereof.

Suitable examples of solid charge carrying media include, but are not limited to, polymeric media, e.g., polyethylene oxide. Suitable examples of liquid charge carrying media include, but are not limited to, ethylene carbonate, propylene carbonate, dimethyl carbonate, diethyl carbonate, ethylmethyl carbonate, butylene carbonate, vinylene carbonate, fluorinated ethylene carbonate, fluorinated propylene carbonate, γ-butyrolactone, methyl difluoroacetate, ethyl difluoroacetate, dimethoxyethane, diglyme (i.e., bis(2-methoxyethyl) ether), tetrahydrofuran, dioxolane, and combinations thereof. Suitable examples of charge carrying media gels include those described in U.S. Pat. Nos. 6,387,570 and 6,780,544, the disclosure of each of which is incorporated herein by reference in its entirety.

The disclosure will be further understood by the following non-limiting examples.

EXAMPLES

Example 1

General Procedure for PTC Electrode Fabrication

To a solution of a polymer (e.g., TORLON®-4000 (polyamide-imide), BM700, or CMC) and/or a filler (e.g., PVDF, SBR, sodium naphthalene sulfonate) in NMP were added barium titanate and optionally carbon black to form a slurry or paste. The slurry or paste was coated onto a surface of an aluminum foil to form a wet barium titanate-containing layer. The wet barium titanate-containing layer was dried to form a PTC layer.

To a solution of a binder (e.g., PVDF) in NMP were added conductive carbon black and $LiNiCoAlO_2$ (NCA) to form a slurry. The slurry was coated onto the surface of the PTC layer to form a wet electroactive material layer. The wet electroactive material layer was compressed to the designed thickness. The positive PTC electrode was dried at 125° C. for 10 hours.

Example 2

General Procedure for PTC Electrode Fabrication

To a solution of a binder (e.g., PVDF) in NMP were added conductive carbon black and $LiNiCoAlO_2$ (NCA) to form a slurry. The slurry was coated onto an electrode surface. The wet electroactive material layer was compressed to the designed thickness. The electrode was dried at 125° C. for 10 hours.

To a solution of a polymer (e.g., TORLON®-4000 (polyamide-imide), BM700, or CMC) and/or a filler (e.g., PVDF, SBR, sodium naphthalene sulfonate) in NMP were added barium titanate and optionally carbon black to form a slurry or paste. The slurry or paste was coated onto the electrode surface to form a wet barium titanate-containing layer. The wet barium titanate-containing layer was dried to form a PTC layer and thus a PTC electrode.

Example 3

Cell Fabrication

A non-PTC negative electrode comprising polyamide-imide coated Si nanoparticles was coated onto a Cu foil using a small doctor blade coater, and then calendared to the designed thickness. The negative electrode was then drive at 140° C. for 10 hours. Once the positive and negative electrodes were dried, all subsequent cell fabrication steps were carried out inside a drying room at a Dew point of about −35° C. The electrodes were tabbed first and then wound into a jellyroll or laminated into a jellyflate. The jellyroll was then inserted into a battery can, such as an 18650 can and a 4 mm thick pouch cell. The jellyroll was then dried at 75° C. for 10 hours. An electrolyte was put into the cell under vacuum. The cell was crimped for sealing a 18650 cell or thermally sealed for a 4 mm thick poun cell after electrolyte filling.

Example 4

Nail Test

The cell was charged at 2A to 4.2V for 3 hours. The cell was placed on a surface of a flat metal. A thermal couple was attached to the surface of the cell to follow the temperature of the cell during the test. The positive and negative tabs were connected to a voltage and resistance meter. A nail was shot at the cell at the speed of 1 mm/sec. The nail completely penetrated the cell. The nail was left inside the cell until the cell temperature returned to room temperature.

Example 5

Overcharge Test

The cell was charged at 2A to 4.2V for 3 hours. The cell was placed in a chamber. A thermal couple was attached to the surface of the cell to follow the temperature of the cell during the test. The positive and negative tabs were connected to a voltage and resistance meter. The cell was overcharged with a power supplier until the cell temperature was close to room temperature.

Example 6

Thermal Spraying

To a solution of a polymer (e.g., TORLON®-4000 (polyamide-imide), BM700, or CMC) and/or a filler (e.g., PVDF, SBR, sodium naphthalene sulfonate) in NMP were added barium titanate and optionally carbon black to form a PTC slurry or paste.

To a solution of a binder (e.g., PVDF) in NMP were added conductive carbon black and LiNiCoAlO$_2$ (NCA) to form an electrode active material slurry.

First, the PTC slurry was thermally sprayed onto the surface of a current collector as a PTC film. Then, the electrode active material slurry was coated onto the surface of the PTC film. The electrode with the PTC layer then was wound into either jellyroll or jellyflat to be made into a cell.

Example 7

PTC Films

Compositions of four PTC films are summarized in Table 1. Samples 1 to 3 were prepared using NMP as a solvent, according to the procedure as described in Example 1. Sample 4 was prepared using water as a solvent, according to the procedure as described in Example 1. Samples 5 to 7 were prepared for comparison, according to the procedure as described in Example 1

Each of the samples was tested as a part of a cathode for a lithium secondary battery as described in Example 3. The test results are summarized in Table 3.

TABLE 1

PTC Films

| Sample No. | Components | | Loading (mg/cm$^2$) |
|---|---|---|---|
| 1 | Carbon black | 1% | 2 |
|  | TORLON ®-4000 (Polyamide-imide) | 29% |  |
|  | Barium titanate | 70% |  |
| 2 | Carbon black | 1% | 0.5 |
|  | PVDF | 7.5% |  |
|  | Barium titanate | 84% |  |
|  | BM700 (A polypropylene) | 7.5% |  |
| 3 | PVDF | 7.5% | 2 |
|  | Barium titanate | 85% |  |
|  | BM700 (Polypropylene) | 7.5% |  |
| 4 | Carbon black | 1% | 0.7 |
|  | SBR | 8.5% |  |
|  | Barium titanate | 84.5% |  |
|  | CMC | 3% |  |
|  | Sodium naphthalene sulfonate | 3% |  |

TABLE 2

Comparative Films

| Sample No. | Components | | Loading (mg/cm$^2$) |
|---|---|---|---|
| 5 | Carbon black | 10% | 0.25 |
|  | PVDF | 90% |  |
| 6 | Carbon black | 10% | 0.25 |
|  | TORLON ®-4000 (Polyamide-imide) | 10% |  |
|  | PVDF | 80% |  |
| 7 | Carbon black | 1% | 2 |
|  | PVDF | 29% |  |
|  | Barium titanate | 84% |  |

TABLE 3

Test Results

| Sample No. | Nail Test | Overcharge Test |
|---|---|---|
| 1 | Pass | Pass |
| 2 | Pass |  |

TABLE 3-continued

Test Results

| Sample No. | Nail Test | Overcharge Test |
|---|---|---|
| 3 | Pass |  |
| 4 | Pass |  |
| 5 | Fail |  |
| 6 | Pass | Fail |
| 7 | Pass | Fail |

The examples set forth above are provided to give those of ordinary skill in the art with a complete disclosure and description of how to make and use the claimed embodiments, and are not intended to limit the scope of what is disclosed herein. Modifications that are obvious to persons of skill in the art are intended to be within the scope of the following claims. All publications, patents, and patent applications cited in this specification are incorporated herein by reference as if each such publication, patent or patent application were specifically and individually indicated to be incorporated herein by reference.

What is claimed is:

1. A positive temperature coefficient (PTC) film comprising a barium titanate and a polyamide-imide, a first layer of the PTC film being disposed on a first surface of a first electroactive layer comprising a battery cell.

2. The positive temperature coefficient film of claim 1, wherein the inorganic PTC compound is in the form of nanoparticles.

3. The positive temperature coefficient film of claim 1, wherein the crosslinked polymer is formed in the presence of the barium titanate.

4. The positive temperature coefficient film of claim 1, further comprising a polyimide and a polypropylene.

5. The positive temperature coefficient film of claim 4, further comprising a polypropylene.

6. The positive temperature coefficient film of claim 1, comprising no less than about 50% by weight of the barium titanate and no greater than about 50% by weight of the polyamide-imide.

7. The positive temperature coefficient film of claim 6, comprising no less than about 70% by weight of the barium titanate and no greater than about 30% by weight of the polyamide-imide.

8. The positive temperature coefficient film of claim 1, further comprising a conductive material.

9. The positive temperature coefficient film of claim 8, wherein the conductive material is carbon black.

10. The positive temperature coefficient film of claim 8, comprising no less than about 50% by weight of the barium titanate, no greater than about 50% by weight of the polyamide-imide, and no greater than about 5% by weight of the conductive material.

11. The positive temperature coefficient film of claim 9, comprising no less than about 70% by weight of the barium titanate, no greater than about 30% by weight of the polyamide-imide, and no greater than about 2% by weight of the conductive material.

12. The positive temperature coefficient film of claim 8, further comprising a filler.

13. The positive temperature coefficient film of claim 12, wherein the filler is a polymer.

14. The positive temperature coefficient film of claim 12, wherein the filler is polyvinylidene fluoride or styrene butadiene rubber.

15. The positive temperature coefficient film of claim 12, comprising no less than about 50% by weight of the barium titanate, no greater than about 50% by weight of the polyamide-imide, no greater than about 5% by weight of the conductive material, and no greater than about 10% by weight of the filler.

16. The positive temperature coefficient film of claim 12, comprising no less than about 70% by weight of the barium titanate, no greater than about 30% by weight of the polyamide-imide, no greater than about 2% by weight of the conductive material, and no greater than about 10% by weight of the filler.

17. The positive temperature coefficient film of claim 1, comprising no less than about 70% by weight of the barium titanate, no greater than about 30% by weight of the polyamide-imide, and no greater than about 2% of carbon black.

18. The positive temperature coefficient film of claim 1, comprising no less than about 70% by weight of the barium titanate, no greater than about 30% of a polypropylene, no greater than about 2% of carbon black, and no greater than about 10% of a polyvinylidene fluoride.

19. The positive temperature coefficient film of claim 1, comprising no less than about 70% by weight of the barium titanate, no greater than about 30% by weight of a polypropylene, and no greater than about 10% by weight of a polyvinylidene fluoride.

20. The positive temperature coefficient film of claim 1, comprising no less than about 70% by weight of the barium titanate, no greater than about 30% by weight of a carboxymethyl cellulose, no greater than 2% by weight of carbon black, and no greater than about 10% by weight of a styrene butadiene rubber.

21. The positive temperature coefficient film of claim 1, wherein the film is formed by crosslinking a precursor of the polyamide-imide in the presence of the barium titanate.

22. The positive temperature coefficient film of claim 1, wherein the positive temperature coefficient film is formed using water as a solvent.

23. The positive temperature coefficient film of claim 1, wherein a second layer of the positive temperature coefficient film is disposed on a second surface of a current collector coupled with the first electroactive layer, and wherein the first electroactive layer is interposed between the first layer of the positive temperature coefficient film and the second layer of the positive temperature coefficient film to prevent a direct contact between the first electroactive layer and a second electroactive layer.

24. A battery cell, comprising a first electrode, a second electrode, a separator, and an electrolyte, at least one of the first electrode, the second electrode, the separator, and the electrolyte comprising a positive temperature coefficient (PTC) film including a barium titanate and a polyamide-imide.

* * * * *